United States Patent
Adler et al.

(10) Patent No.: US 11,688,067 B2
(45) Date of Patent: Jun. 27, 2023

(54) METHODS AND SYSTEMS FOR DETECTING DEFECTS IN DEVICES USING X-RAYS

(71) Applicant: Bruker Nano, Inc., Santa Barbara, CA (US)

(72) Inventors: David Lewis Adler, San Jose, CA (US); Scott Joseph Jewler, San Jose, CA (US); Freddie Erich Babian, Palo Alto, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 158 days.

(21) Appl. No.: 16/924,581

(22) Filed: Jul. 9, 2020

(65) Prior Publication Data

US 2021/0012499 A1 Jan. 14, 2021

Related U.S. Application Data

(60) Provisional application No. 62/873,752, filed on Jul. 12, 2019.

(51) Int. Cl.
*G06K 9/00* (2022.01)
*G06T 7/00* (2017.01)
(Continued)

(52) U.S. Cl.
CPC .......... *G06T 7/0014* (2013.01); *G01N 23/04* (2013.01); *G01N 23/043* (2013.01);
(Continued)

(58) Field of Classification Search
None
See application file for complete search history.

(56) References Cited

U.S. PATENT DOCUMENTS

2003/0118149 A1   6/2003   Okuda
2007/0009086 A1*  1/2007   Yoshino ............... G01N 23/046
                                                              378/57
(Continued)

FOREIGN PATENT DOCUMENTS

EP    3121591 B1 *  5/2022   ............. G01B 15/04
JP    H05149733 A  *  6/1993
(Continued)

OTHER PUBLICATIONS

Thomas et al. ("X-Ray Inspection of Lead and Lead-Free Solder Joints", https://smt.iconnect007.com/index.php/article/105578/x-ray-inspection-of-lead-and-lead-free-solder-joints/105581/?skin=smt, 2017 (Year: 2017).*

(Continued)

*Primary Examiner* — Randolph I Chu
(74) *Attorney, Agent, or Firm* — Boyle Fredrickson S.C.

(57) ABSTRACT

In one embodiment, an automated high-speed X-ray inspection system may generate a first X-ray image of an inspected sample at a first direction substantially orthogonal to a plane of the inspected sample. The first X-ray image may be a high-resolution grayscale image. The system may identify one or more elements of interest of the inspected sample based on the first X-ray image. The first X-ray image may include interfering elements that interfere with the one or more elements of interest in the first X-ray image. The system may determine one or more first features associated with respective elements of interest based on variations of grayscale values in the first X-ray images. The system may determine whether one or more defects are associated with the respective elements of interest based on the one or more first features associated with the element of interest.

17 Claims, 8 Drawing Sheets

(51) Int. Cl.
- *G06N 20/00* (2019.01)
- *G06F 30/398* (2020.01)
- *G01N 23/04* (2018.01)
- *G01N 23/083* (2018.01)
- *G01N 23/18* (2018.01)
- *G01T 1/20* (2006.01)
- *G06T 5/00* (2006.01)
- *H01L 21/67* (2006.01)
- *H05K 1/11* (2006.01)
- *H05K 3/40* (2006.01)
- *G06F 18/24* (2023.01)
- *G06F 18/214* (2023.01)
- *G06F 119/18* (2020.01)
- *G06F 115/12* (2020.01)

(52) U.S. Cl.
CPC ........... *G01N 23/083* (2013.01); *G01N 23/18* (2013.01); *G01T 1/20* (2013.01); *G06F 18/214* (2023.01); *G06F 18/24* (2023.01); *G06F 30/398* (2020.01); *G06N 20/00* (2019.01); *G06T 5/007* (2013.01); *G06T 7/0012* (2013.01); *H01L 21/67288* (2013.01); *H05K 1/115* (2013.01); *H05K 3/4038* (2013.01); *G01N 2223/04* (2013.01); *G01N 2223/401* (2013.01); *G01N 2223/426* (2013.01); *G01N 2223/505* (2013.01); *G01N 2223/6466* (2013.01); *G06F 2115/12* (2020.01); *G06F 2119/18* (2020.01); *G06T 2207/10081* (2013.01); *G06T 2207/10116* (2013.01); *G06T 2207/20024* (2013.01); *G06T 2207/20081* (2013.01); *G06T 2207/20208* (2013.01); *G06T 2207/30004* (2013.01)

(56) References Cited

U.S. PATENT DOCUMENTS

| | | |
|---|---|---|
| 2009/0080764 A1 | 3/2009 | Srinivasan |
| 2015/0270023 A1 | 9/2015 | Adler |
| 2017/0200524 A1 | 7/2017 | Adler |
| 2018/0293721 A1 | 10/2018 | Gupta |
| 2018/0342051 A1 | 11/2018 | Sezginer |
| 2019/0212281 A1 | 7/2019 | Shchegrov |
| 2020/0292471 A1* | 9/2020 | Xia .................. G06T 7/001 |
| 2022/0077203 A1* | 3/2022 | Ootsuka ........ H01L 27/14623 |

FOREIGN PATENT DOCUMENTS

| | | | |
|---|---|---|---|
| JP | 2005283577 A | 10/2005 | |
| JP | WO2019155593 A1 * | 10/2020 | ............. G06T 7/001 |
| KR | 20200075704 A * | 6/2020 | ............. G06F 16/55 |
| WO | WO 2007057144 A2 | 5/2007 | |
| WO | WO 2010025539 A1 | 3/2010 | |

OTHER PUBLICATIONS

International Search Report and Written Opinion for International Application No. PCT/US2020/041514, dated Oct. 20, 2020.

International Search Report and Written Opinion for International Application No. PCT/US2020/041508, dated Oc. 30, 2020.

* cited by examiner

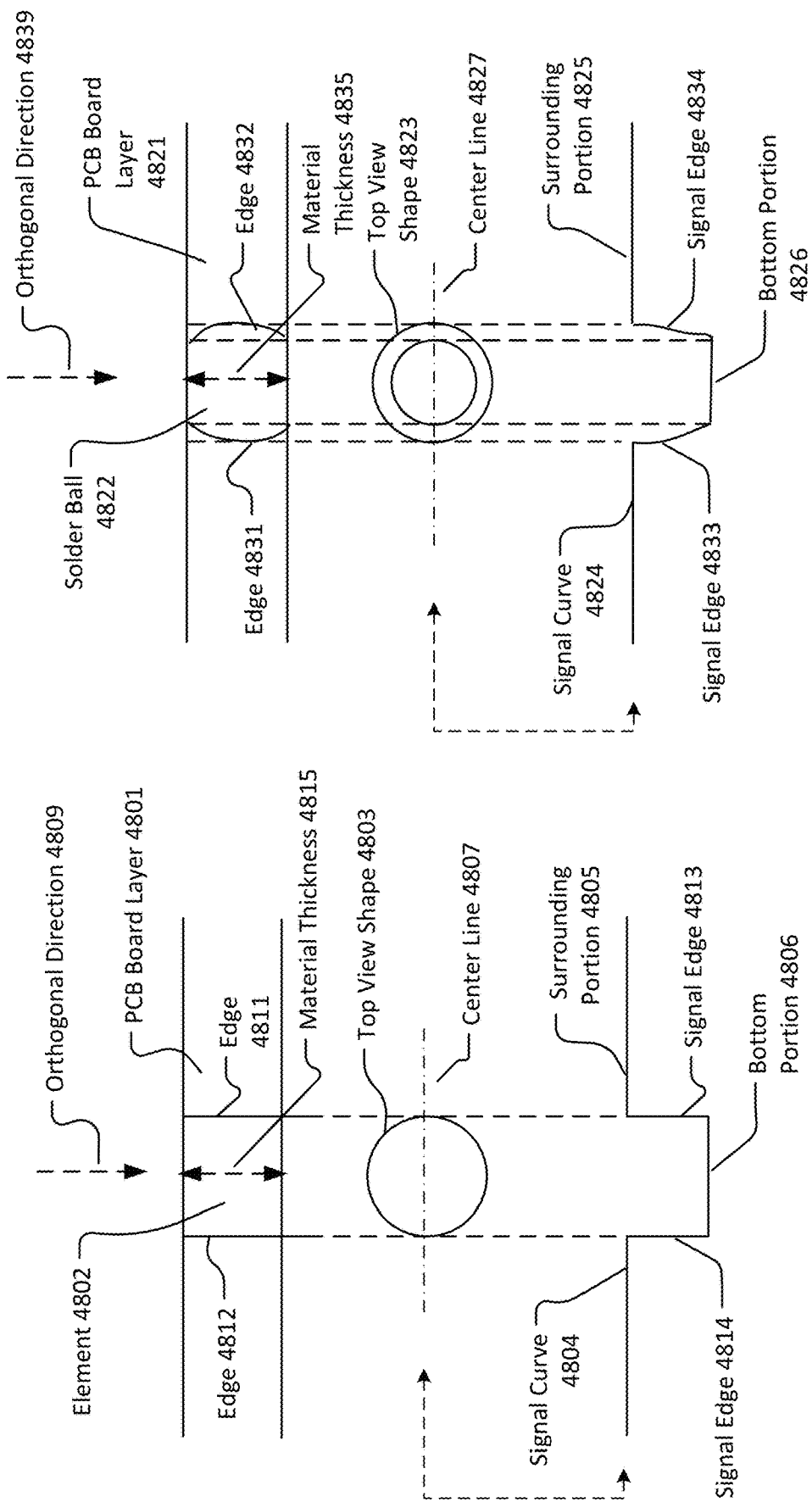

4880

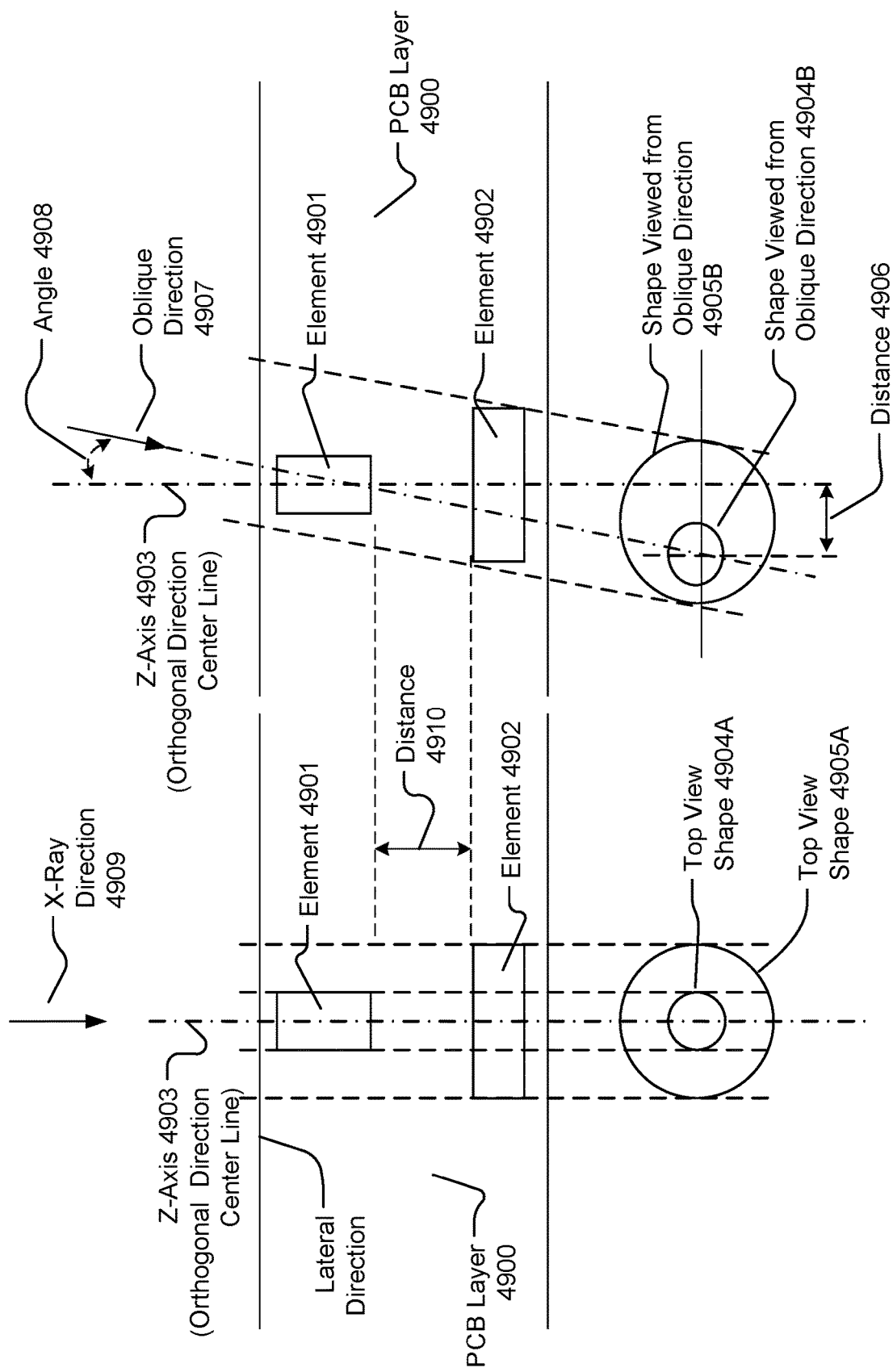

5800

Generate, by an automated high-speed X-ray inspection system, a first X-ray image of a device from a first direction
5802

↓

Identify, using a machine-learning model, an element of interest of the device from the first X-ray image, wherein the first X-ray image comprises a number of interfering elements which overlap or intersect with the element of interest in the first X-ray image
5804

↓

Determine, using the machine-learning model, one or more features associated with the element of interest along an orthogonal direction of the device, wherein the one or more features are determined based on variations of corresponding grayscale values of the first X-ray images
5806

↓

Determine one or more quality metrics associated with the element of interest based on the one or more features associated with the element of interest.
5808

*FIG. 4*

METHODS AND SYSTEMS FOR DETECTING DEFECTS IN DEVICES USING X-RAYS

PRIORITY

This application claims the benefit under 35 U.S.C. § 119(e) of U.S. Provisional Patent Application No. 62/873,752, filed 12 Jul. 2019, which is incorporated herein by reference.

TECHNICAL FIELD

This invention relates to the high-speed examination and inspection of objects using X-rays.

BACKGROUND

Integrated circuits may be manufactured to include 3D or 2.5D structures. The inspection techniques using optical photons or electrons to inspect silicon wafers cannot be used to inspect 3D and 2.5D IC packages because they do not penetrate through the ICs, interposers, or Cu—Cu die to die bonding sufficiently to provide an internal view of the packaged ICs. Optical inspection methods are also not capable of performing inspection or metrology for partially packaged components, a critical requirement for process control. Since X-rays can penetrate through many layers of packaging, X-ray inspections may provide an internal view of the assembled device.

However, existing X-ray systems lack sufficient resolution and imaging speed to meet the needs for high-resolution, high-throughput IC and electronic packaging inspection. For example, traditional computed tomography (CT) using X-rays may need to take many slices of X-ray images of the inspected objects and use the large number of slices to construct 3D model of the object, and therefor is very slow and not suitable for inspecting integrated circuits.

SUMMARY OF PARTICULAR EMBODIMENTS

Particular embodiments described herein relate to systems and methods for inspecting integrated circuit devices or packages using a single X-ray image (e.g., a top-down X-ray image, a bottom-up X-ray image, or an X-ray image captured at any suitable angle) or multiple X-ray images generated at different angles. An automated high-speed X-ray inspection system may generate a first high-resolution grayscale X-ray image of an inspected sample at a first direction substantially orthogonal to a plane of the inspected sample. The first X-ray image may be generated by an X-ray detector having a high dynamic range (e.g., greater than 10 K) and the first X-ray image may have greater than 10 K grayscale levels. In particular embodiments, the first X-ray image having a high dynamic range X-ray image (e.g., having greater than 10 K grayscale levels) may be a superposition of multiple low dynamic range X-ray images generated with different X-ray exposure settings using one or more low dynamic range X-ray detectors (e.g., having a dynamic range lower than 10 K). The automated high-speed X-ray inspection system may identify, from a number of elements of the inspected sample, one or more elements of interest of the inspected sample based on the first X-ray image. The first X-ray image may include a number of interfering elements that interfere with the one or more elements of interest in the first X-ray image. The automated high-speed X-ray inspection system may determine, for each of the one or more elements of interest, one or more first features associated with the respective element of interest (e.g., a material thickness, a shape, a size, a distance to other elements, a position, a relative placement to other elements, a stacking order, a profile variation, a gradient). The one or more first features may be determined based on variations of grayscale values in the first X-ray images. The automated high-speed X-ray inspection system may determine, for each of the one or more elements of interest, whether one or more defects are associated with the respective element of interest based on the one or more first features associated with the element of interest.

In particular embodiments, the automated high-speed X-ray inspection system may generate a second X-ray image of the inspected sample from a second direction different from the first direction. The automated high-speed X-ray inspection system may determine one or more second features associated with the element of interest by comparing the first X-ray image and the second X-ray image (e.g., a stacking order of two or more layers, a position change of the element of interest, a shape change of the element of interest, a position change of an interfering element, a shape change of an interfering element, one or more grayscale value changes associated with the element of interest, one or more grayscale value changes associated with an interfering element). The automated high-speed X-ray inspection system may determine that the one or more defects associated with the element of interest are false positive results based on a determination that the one or more second features of the element of interest invalidate the determination that the one or more defects are associated with the element of interest based on the one or more first features. Or, the automated high-speed X-ray inspection system may confirm the one or more defects being associated with the element of interest based on a determination that the one or more second features confirm that the one or more defects are associated with the element of interest based on the one or more first features.

In particular embodiments, the one or more defects associated with the element of interest may be identified by a machine-learning model trained by a large sample population (e.g., greater than 10 K samples). The machine-learning model, after being trained, may identify the element of interest from a number of interfering elements. The automated high-speed X-ray inspection system may generate two or more reference X-ray images for respective adjacent inspected samples of the inspected sample. The automated high-speed X-ray inspection system may generate a reference model for the inspected sample based on the two or more reference X-ray images. The automated high-speed X-ray inspection system may compare, using a computer vision algorithm, the first X-ray image of the inspected sample to the reference model and identify the one or more defects associated with the element of interest based on the comparison between the first X-ray image and the reference model. The element of interest may be a solder connection and the one or more defects associated with the solder connection may include, for example, but are not limited to, a void defect, a head-in-pillow defect, a non-wet defect, a non-contact open defect, a misalignment, a bridging/short defect, etc.

In particular embodiments, the automated high-speed X-ray inspection system may include an X-ray source emitting an X-ray beam with a white spectrum and one or more X-ray filters filtering out respective spectrum ranges of the X-ray beam. The one or more X-ray filters may a first X-ray filter corresponding to a first spectrum range being absorbable by a first material and a second X-ray filter corresponding to a second spectrum range being absorbable by a second material. The automated high-speed X-ray inspection system may generate a first material selective X-ray image with the first X-ray filter being applied to the X-ray source. The first material selective X-ray image may exclude the elements made of the first material. The automated high-speed X-ray inspection system may generate a second material selective X-ray image with the second X-ray filter being applied to the X-ray source. The second material selective X-ray image may exclude elements made of the second material. The automated high-speed X-ray inspection system may generate an enhanced X-ray image by combining the first material selective X-ray image and the second material selective image. The enhanced X-ray image may have a higher signal-to-noise ratio than the first X-ray image. The one or more defects associated with the element of interest may be identified based on the first material selective X-ray image, the second material selective X-ray image, or the enhanced X-ray image.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2A illustrates an example process for measuring material thickness and shape of an element of interest within a PCB board layer (along an orthogonal direction of the PCB board layer).

FIG. 2B illustrates an example process for inspecting a solder ball within a PCB board layer based on a single X-ray image.

FIGS. 3A-3B illustrate an example process for measuring one or more features along the orthogonal direction of the inspected component based on two or more X-ray images captured at different angles.

FIG. 4 illustrates an example method for identifying defective solder connections based on a single X-ray image.

Figure 1A:
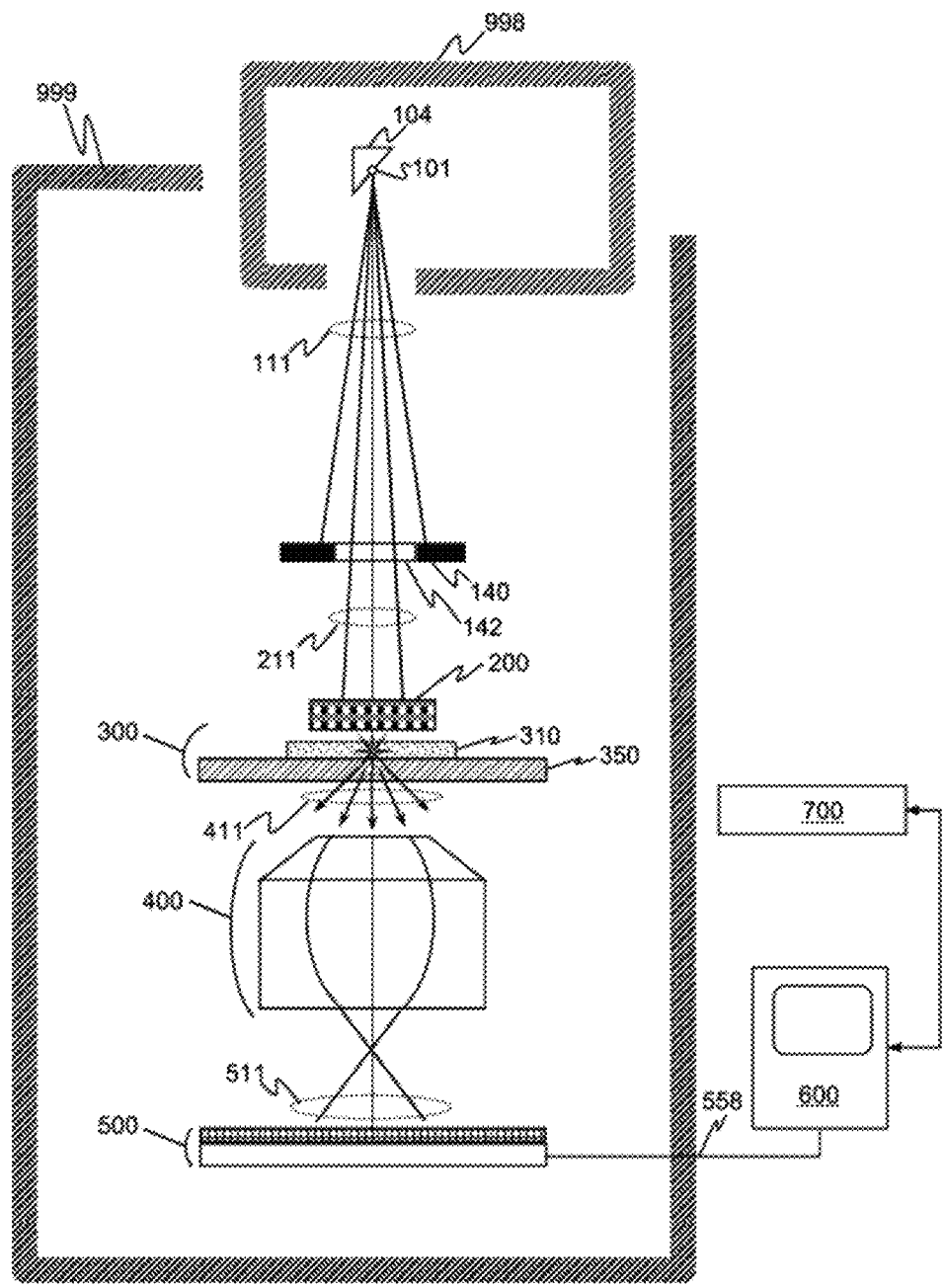
FIG. 1A illustrates an example X-ray imaging system.

Note: Elements shown in the drawings are meant to illustrate the functioning of the invention, and have not been drawn to scale.

DESCRIPTION OF EXAMPLE EMBODIMENTS

Automated High-Speed X-Ray Inspection System.

X-Ray System Framework.

The system and methods disclosed herein are related to a system or the use of a system that illuminates an object to be examined or inspected with X-rays, converts X-rays to visible (or near-visible) photons, forms an image of the visible (or near-visible) photons, and then converts the image into an electronic form.

As such, the various embodiments of this X-ray image formation system will be presented first, followed by the various embodiments of methods and systems that utilize the X-ray imaging system.

Although many kinds of objects can be examined or inspected using the apparatus disclosed here, it is expected to be especially suitable for the examination and inspection of integrated circuit wafers and packaging assemblies. One example of these are silicon interposers, comprising silicon with multiple TSVs, but the invention can also be used for the inspection of an integrated circuit (IC) itself, a silicon interposer, a silicon dioxide interposer, a printed circuit board (PCB) with or without ICs already installed, a 3D IC package or assembly, a 2.5D IC package or assembly, a multi-chip module (MCM), a system-in-package (SIP) and other electronic microdevices or portion thereof that comprise microscopic structures. These may be examined as incoming materials, completed products, or as partially manufactured objects at any stage of their manufacture for the purpose of metrology, process control, inspection, or yield management.

Non-electronic devices with micro- or nano-structures, such as magnetic recording media, photonic structures and photonic crystals, metamaterials, etc., can also be examined and inspected using this invention. Capacitive sensors, such as fingerprint sensors, can also be examined. A particularly attractive feature of the apparatus is that it is possible to make non-destructive, high-resolution observations and measurements of features within an object that cannot otherwise be seen using electrons or optical photons, as are used in conventional metrology and inspection tools.

In general, objects suitable for use with this invention will comprise at least one flat side. Examples include: electronic circuits on semiconductor wafers, parts of wafers or selected areas on wafers; integrated circuit chips, dice, assemblies, packages, or portions thereof; micro-fluidic devices; micro-electro-mechanical systems (MEMS), including accelerometers, gyros, magnetic and capacitive sensors and the like;

photonic devices, particularly those fabricated using planar waveguides; biological tissues, including stained samples; photomasks or templates for printing or fabricating any of the above mentioned devices; and solar cells, parts thereof or parts pertaining to solar cells. Other objects without flat sides may be observed and inspected as well, but the image quality may not be uniform for objects of irregular dimensions.

In particular embodiments, the X-ray inspection system as described in this disclosure may be a high-speed X-ray inspection system. In particular embodiments, the high-speed X-ray inspection system may have a higher measurement/inspection speed than traditional X-ray systems (e.g., 100 times faster than traditional X-ray systems). As an example and not by way of limitation, the high-speed X-ray inspection system may be capable of inspecting electronic components or devices with an image collection time of approximately 33 milliseconds. In particular embodiments, the X-ray inspection system as described in this disclosure may be an automated X-ray inspection system. In particular embodiments, the automated X-ray inspection system may include one or more computers or controllers and instructions stored in one or more computer media. The automated measurement process of the automated X-ray inspection system may be controlled by the computers or controllers by executing corresponding instructions. The automated measurement process of the automated X-ray inspection system may not need interventions from human operators and may be automatically performed following particular procedures.

In particular embodiments, the X-ray inspection system as described in this disclosure may use one more artificial intelligence (AI) modules and/or machine-learning (ML) models. In particular embodiments, the artificial intelligence (AI) modules may be or include any suitable methods, processes, and/or algorithm performed by one or more computing systems. In particular embodiments, the machine-learning models may be or include, for example, but are not limited to, a rule-based algorithm, a random forest model, a neutral network or any suitable machine-learning models. In particular embodiments, the X-ray inspection system as described in this disclosure may perform real-time measurements to one or more processes performed by another system (e.g., a drilling machine, a bonding tool, an assembling tool, or any suitable tools). In particular embodiments, the term "real-time measurements" may refer to measurements performed by the X-ray inspection system in parallel to an associated process (e.g., a drilling process, an assembling process, a bonding process, or any suitable processes) without slowing down the associated process. The X-ray inspection system may perform measurements and provide feedback to the systems performing the associated process in a speed higher than or equal to the speed of the associated process.

In particular embodiments, the X-ray inspection system as described in this disclosure may perform in situ and/or inline measurements to one or more other systems or tools (e.g., a drilling machine, a bonding tool, an assembling tool, or any suitable tools). In particular embodiments, the term "in situ measurements" may refer to measurements performed by the X-ray inspection system which is integrated with other systems. For example, the X-ray inspection system may be integrated into a drilling machine and perform in situ measurements to monitor the drilling process of the drilling machine. The in situ measurements may be automatically controlled by one or more computing systems coordinating the X-ray inspection system and the drilling machine. In particular embodiments, the term "inline measurements" may refer to measurements performed by the X-ray inspection system within the same process (e.g., a drilling process, an assembling process, a bonding process, or any suitable processes) performed by another system (e.g., a drilling machine, a bonding tool, an assembling tool, or any suitable tools). For example, during an assembling process performed by an assembling tool, the X-ray system may inspect the assembled components or devices during one or more steps of the assembling process. The components or devices may be automatically transferred from the assembling tool to the X-ray inspection system (e.g., by a robot arm) or may be manually transferred from the assembling tool to the X-ray inspection system (e.g., by a human operator). The X-ray inspection system may provide feedback information automatically to the assembling tool or to a human operator.

X-Ray Imaging System.

FIG. 1A illustrates an example X-ray imaging system. An X-ray emitter 101 emits X-rays 111. These X-rays are then shaped into a collimated X-ray beam 211, in some embodiments using distance from the emitter 101 and a plate 140 with an aperture 142. This collimated X-ray beam 211 then illuminates an object 200 to be examined. The X-rays that are transmitted through the object 200 illuminate a scintillator assembly 300 comprising a scintillator 310 and, in some embodiments, a support 350 for the scintillator. The scintillator 310 absorbs a portion of the X-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted to a system of electronics 600 that, in some embodiments can display the image results, and in some embodiments can store the image results and/or perform image processing algorithms on the image results in conjunction with a computer system 700.

For any source emitting ionizing radiation such as X-rays, it is often wise to provide shielding 998 around the X-ray source 100, and in some situations legally required for operation. Such shielding 998 can be a simple enclosure of shaped sheets of lead metal, or a more intricate design fabricated from any of a number of X-ray absorbing materials, such as lead-doped glass or plastic, that will be known to those skilled in the art. Shielding is desirable to keep random X-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of X-ray absorbing materials such as lead-doped glass or plastic, that will be known to those skilled in the art. Additional shielding 999 is desirable to keep random X-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to X-ray exposure, in some embodiments a portion of the scintillator assembly 300 can also be fabricated in whole or in part using a material, such as a lead-doped glass, which absorbs X-rays while transmitting the visible photons 411 emitted by the scintillator.

Figure 1B:
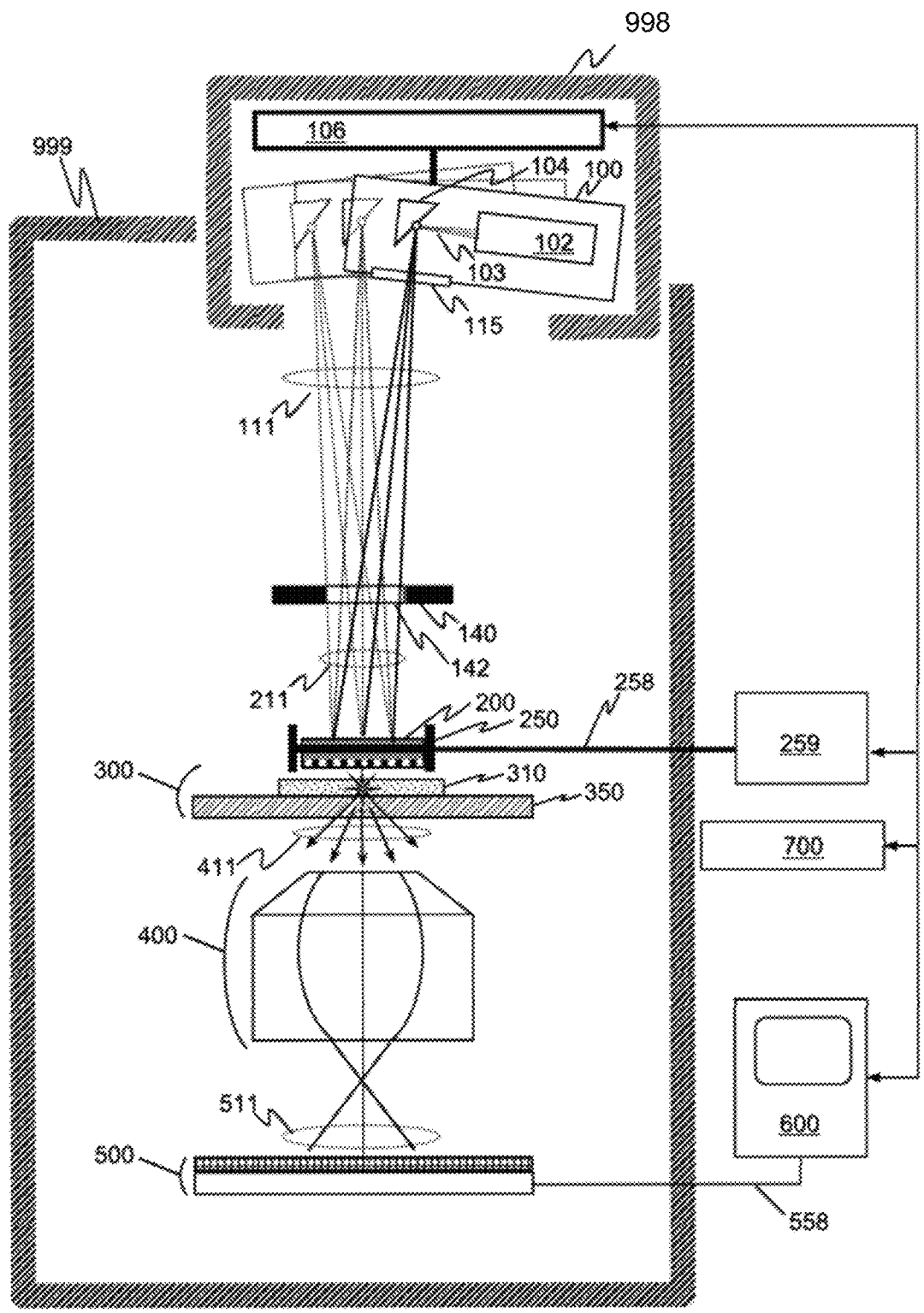
FIG. 1B illustrates an example X-ray system with movable X-ray source with respect to the inspected object for generating X-ray images at different directions.

FIG. 1B illustrates an example X-ray system with movable X-ray source with respect to the inspected object for generating X-ray images at different directions. As an example and not by way of limitation, the X-ray system may include a mount 106 that can move the position of the X-ray source 100 relative to the object 200, thereby changing the angle of incidence of the X-ray beam on the object. The mount 106 can be designed to allow the X-ray source 100 to swing in the x-z plane, in the y-z plane, or any other combination of axes. The source can also be moved along the z-axis to move the X-ray source 100 closer to the object 200. This may have the effect of making the beam brighter, increasing signal strength, at the cost of having an X-ray beam that is less collimated, reducing resolution. This effect may be reduced or eliminated by reducing the spot size of the X-ray source.

Motion of the X-ray source 100 using the mount 106 can be controlled by the computer system 700 several ways. In some embodiments, the source mount 106 may move the X-ray source 100 to a fixed location to allow an image to be captured. In some embodiments, the mount 106 can move the X-ray source 100 continuously as images are gathered, allowing the dynamic change of X-ray intensity as transmitted through the object 200 to be recorded as a function of illumination angle. In some embodiments, the X-ray emitter 101 can be moved to at least 10 degrees off the normal incidence angle. In some embodiments, further adjustment of the angle of incidence of the X-ray beam 211 on the object 200 can be achieved by coordinating the motion of the X-ray source 100 using the source mount 106 with the motion of the object 200 using the object mount 250. This coordination can be done manually or using the computer system 700. In some embodiments, the shielding 998 will be designed to enclose the X-ray source 100 and the source mount 106. In other embodiments, the shielding 998 can be designed to only enclose the X-ray source, with the mount 106 designed to move the shielding 998 as it moves the X-ray source 100. In some embodiments of the invention, multiple X-ray sources may be used to produce images with different angles of incidence. The X-ray sources may be fixed in space or moveable and may be operated sequentially or simultaneously. They can be operated manually or controlled by one or more computer systems 700.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors with a high sensitivity for X-ray radiation, a very large number of grayscale levels (e.g., 10,000+ grayscale levels) with a large dynamic range, and a large number of pixels (e.g., greater than or equal to 29 megapixels) for generating high resolution images. In particular embodiments, the system may have a spatial resolution of lower than 2 µm, a field of view of 12 mm×12 mm, and a throughput greater than 3000 mm$^2$ per minute. More details about the X-ray system may be found in U.S. patent application Ser. No. 15/470,726, filed 27 Mar. 2017, which is incorporated herein by reference.

Inspection Based on Grayscale Variations in X-Ray Images.

[X-Ray Inspection Applications on PCB Packages and Devices]

In particular embodiments, the automated high-speed X-ray inspection system may inspect integrated circuit device packages having printed circuit boards to detect defects. An integrated circuit device package may include a number of components connected to printed circuit boards. In particular embodiments, the device package may include one or more electrically connected components that have been individually fabricated, one or more solder contacts, and a number of features smaller than 500 microns. In particular embodiments, the integrated circuit device package being produced with a defect rate of less than or equal to 1 part per billion based on inspections by an automated high-speed X-ray inspection system. In particular embodiments, the automated high-speed X-ray inspection system may inspect integrated circuit device packages for checking the Cu—Cu die to die bonding of the packages. The automated high-speed X-ray inspection system may check the results of a Cu—Cu die to die bonding during an in situ inspection process. In particular embodiments, the automated high-speed X-ray inspection system may rapidly inspect TSV, flip chip, and interposer as well as MCP devices during an in situ inspection inline with the TSV or MCP packaging processing.

In particular embodiments, the device package may be, for example, but are not limited to a high-density chip package, a 2.5D high-density chip package, a 3D high-density chip package, a package on package (PoP), a radio frequency (RF) package, a system-in-package (SIP) device, or a fan-out wafer level package. In particular embodiments, the defects in the device package may be solder contact defects including, for example, but not limited to a head-in-pillow defect, a snowman defect, a missing solder defect, a low solder volume defect, a high solder volume defect, a solder bridging defect, a partially-wet defect, a misalignment defect, a micro-bump defect, a cracked solder ball, a solder ball void, or a defective solder contact diameter. In particular embodiments, the solder defect may be identified based on a number of parameters measured by the automated high-speed X-ray inspection system. The parameters may include, for example, but not limited to a uniformity metric of the solder contact external size, a joint diameter, a darkness metric of a contact pad area, a uniformity metric for a darkness coverage of the contact pad area, a continuous signal variation over a location of a contact pad, a bright signal ring where a ball and solder meet, a small dark and uniform coverage over the contact pad area, or deviations from parameters normally defining a good joint. In particular embodiments, the automated high-speed X-ray inspection system may further detect one or more of a misaligned optical fiber, a misaligned optical connector, a warpage defect, a defective gap, a defective bond-line length, or a die warpage defect in a ball grid array (BGA). In particular embodiments, the solder defects may be caused by many factors including, for example, but not limited to contamination, temperature, heat produced by RF power, or other factors. In particular embodiments, the automated high-speed X-ray inspection system may rotate the X-ray source and keep the inspected devices or device packages stay fixed. In particular embodiments, the automated high-speed X-ray inspection system may shift measurement from one solder contact to other solder contact in the same image or in a different image.

In particular embodiments, the automated high-speed X-ray inspection system may capture one or more reference images for the components of the inspected devices. In particular embodiments, the reference images may be for individual component or multiple components in groups. In particular embodiments, the reference images for the components may be captured before the components are connected to the printed circuit boards. In particular embodiments, the reference images for the components may be captured before the device under inspection is attached to a die. In particular embodiments, the automated high-speed X-ray inspection system may capture one or more images of the device package under inspection. In particular embodiments, the automated high-speed X-ray inspection system may identify a shape of each solder contact based on the device images and the reference images. In particular embodiments, the automated high-speed X-ray inspection system may use a solder-bump shape to differentiate a wet connection and a non-wet connection to identify solder defects. In particular embodiments, the automated high-speed X-ray inspection system may generate a processed image by subtracting the reference images from the image of the inspected device. In particular embodiments the automated high-speed X-ray inspection system may identify the shape of each solder contact based on the processed image. In particular embodiments, the automated high-speed X-ray inspection system may determine a percentage of wetting for each solder contact based on the identified shape. In particular embodiments, the automated high-speed X-ray inspection system may identify one or more solder defects based on the identified shape and the determined percentage of wetting of each solder contact. In particular embodiments, the solder defects may be identified using an artificial intelligence (AI) module and a machine learning (ML) algorithm.

In particular embodiments, the automated high-speed X-ray inspection system may sort the shapes of the solder contacts into different classes using the artificial intelligence (AI) module and the machine learning (ML) algorithm. In particular embodiments, the automated high-speed X-ray inspection system may identify the solder defects based at least in part on the sorted classes of the solder contact shapes using the artificial intelligence (AI) and the machine learning (ML) algorithm. In particular embodiments, the automated high-speed X-ray inspection system may provide the component lateral alignment measurement and chip gap measurement. In particular embodiments, the automated high-speed X-ray inspection system may provide measurements that can be tracked for six-sigma process control.

In particular embodiments, the automated high-speed X-ray inspection system may inspect devices for identify variations that may cause defects. In particular embodiments, the variations may include, for example, but are not limited to a convex, a concave, a chip shape, a chip gap, a chip-substrate gap, a lateral shift, a blond-line length variation, a chip-substrate lateral alignment metric, a component lateral alignment metric, a stacked-die lateral alignment metric, an optical fiber-connector alignment metric, a misalignment variation, a percentage of wetting, a percentage of non-wetting, a warpage metric, a low solder volume, a high solder volume, a micro-bump metric, a crack metric of a solder ball, a die warpage in a ball grid array (BGA), a solder ball void size, a solder contact diameter, a wetting angle, an edge bending angle, a spread area, or a continuous signal variation over a location of a contact pad. In particular embodiments, the automated high-speed X-ray inspection system may identify the variations before the variations cause defects. In particular embodiments, the automated high-speed X-ray inspection system may identify the variations using the artificial intelligence (AI) module and the machine learning (ML) algorithm.

In particular embodiments, the automated high-speed X-ray inspection system may generate a statistical process control chart of the solder contacts for a six-sigma control process. In particular embodiments, the automated high-speed X-ray inspection system may inspect the devices at a speed of 1 thousand to 25 thousand units per hour or at least 60 cm$^2$ per minute. In particular embodiments, the inspections by the automated high-speed X-ray inspection system may be inline and in real time. In particular embodiments, the artificial intelligence (AI) module and the machine learning (ML) algorithm may work in real time.

In particular embodiments, the automated high-speed X-ray inspection system may measure the gap of a number of solder balls in a ball-grid-array (BGA) and determine a map of the solder balls. In particular embodiments, the automated high-speed X-ray inspection system may measure the lateral alignment between the integrated chip and the substrate or the alignment between the integrated chip and 3D stacked dies. In particular embodiments, the automated high-speed X-ray inspection system may inspect objects up to 36 inches by 48 inches. The objects may include, for example, but are not limited to panels, wafers, strips, or trays. In particular embodiments, the automated high-speed X-ray inspection system may load trays up to 36 inches by 48 inches with multiple samples including, for example, but not limited to 6 wafers with each wafer in size of 6 inches by 12 inches, or 2 panels with each panel in size of 18 inches by 24 inches, or 48 strips with each strip in size of 70 mm by 240 mm. In particular embodiments, the automated high-speed X-ray inspection system may automatically handle standard JEDEC for strips, trays, wafers, and panels. In particular embodiments, the automated high-speed X-ray inspection system may have a resolution down to 1 um. In particular embodiments, the automated high-speed X-ray inspection system may have a resolution from 0.5 um to 5 um. In particular embodiments, the automated high-speed X-ray inspection system may have field of view of a 100 MP image sensor. In particular embodiments, the automated high-speed X-ray inspection system may load the inspected objects in batch. In particular embodiments, the automated high-speed X-ray inspection system may have a platform size of 24 inches by 36 inches. In particular embodiments, the automated high-speed X-ray inspection system may have a platform size of 36 inches by 48 inches.

In particular embodiments, the inspections of solder defects by the automated high-speed X-ray inspection system may have two-dimensional or three-dimensional information of the solder contact, which may be useful to identify solder contact defect that cannot be identified by one cross section in a specific direction. In particular embodiments, the automated high-speed X-ray inspection system may be more sensitive to detect solder contact defects. In particular embodiments, the inspections by the automated high-speed X-ray inspection system may be inline and in real time during the manufacturing or assembling process. In particular embodiments, the automated high-speed X-ray inspection system may inspect the devices or packages at the higher speed than previous techniques using the high X-ray flux and fast imaging. In particular embodiments, the automated high-speed X-ray inspection system may inspect the integrated device package at a speed up to 500,000 samples per day. In particular embodiments, the automated high-speed X-ray inspection system may inspect devices or packages at a speed of 1000 to 25,000 units per hour or at least 60 cm² per minute.

In particular embodiments, the same automated high-speed X-ray inspection system may have larger field-of-view (megapixels) and better resolution and higher speed than previous techniques. In particular embodiments, the same automated high-speed X-ray inspection system may have lower noise, astronomy-grade detector with better SNR, lower distortion, flat-filed imaging with less parallax, and better precision. In particular embodiments, the same automated high-speed X-ray inspection system may be used for multiple purposes including, for example, but not limited to monitoring the die-attach issues affecting product quality and reliability. The issues may include, for example, but are not limited to solder quality (degree of wetting and non-wetting) for each contact, alignment between components, or chip warpage heat-maps for each component. In particular embodiments, the same automated high-speed X-ray inspection system may be used to inspect high-density chip packaging including, for example, but not limited to 2.5 D high-density chip, 3D stacked-die, or fan-out wafer level package (FOWLP). In particular embodiments, the same automated high-speed X-ray inspection system may provide measurements that can be tracked with six-sigma control process. In particular embodiments, the same automated high-speed X-ray inspection system may provide measurements for zero defect manufacturing process in which the defect rate is no more than 1 part per billion. In particular embodiments, the same automated high-speed X-ray inspection system may provide measurements for six-sigma manufacturing process in which the defect rate is from 1 part per billion to 10 parts per million. In particular embodiments, the same automated high-speed X-ray inspection system may be used in many stages of producing the integrated device package including, for example, but not limited to the printed circuit board design process, the printed circuit board back-drilling process, the inspections before and after back-drilling process, the assembling process, or the inspection after being assembled. The above discussed advantages are for exemplary purpose only and the advantages are not limited thereof. The advantages may include other advantages. Each of the advantages may be for a specific embodiment and is not required in all embodiments. A specific embodiment may include any of the advantages or none of the advantages.

[X-Ray Inspection Based on Grayscale Variation]

In the electronics industry, cross-section images are commonly used for inspection and analysis of electronic components or devices. For example, a computational tomography (CT) X-ray imaging technique may be used to create cross-section images of features of interest. However, this technique requires generating a large quantity of images (e.g., images of many angles and slices), and therefore is relatively slow. Moreover, for CT imaging, the positions of the inspected sample, the X-ray source, and the X-ray detector must be precisely controlled to minimize distortion in the rendered cross sections. For high resolution X-ray CT imaging, the distance between the inspected sample and the X-ray source must be minimized and the sample must be rotated to create images from multiple angles. All these limitations may limit the size of the sample that can be inspected and the inspection speed of the inspection process. Furthermore, while the computational tomography imaging may be acceptable for some failure analysis applications, it is not suitable to be used by electronics manufacturers to inspect and analyze component attributes during manufacturing processes due to the lengthy processing time and the limitation on sample size. As a result, the limitations of the computational tomography imaging technique severely restrict its applications for inline inspection and in-situ monitoring of electronics manufacturing process.

In particular embodiments, the X-ray imaging system described in this disclosure may be an automated high-speed and high-resolution X-ray imaging system for generating X-ray images of electronic devices. In particular embodiments, the automated high-speed X-ray inspection system may include X-ray detectors with a high sensitivity for X-ray radiation, a very large number of grayscale levels (e.g., 10,000+ grayscale levels) with a large dynamic range, and a large number of pixels (e.g., greater than or equal to 29 megapixels) for generating high resolution images. In particular embodiments, the system may have a spatial resolution of lower than 2 µm, a field of view of 12 mm×12 mm, and a throughput greater than 3000 mm² per minute.

In particular embodiments, the automated high-speed X-ray inspection system may inspect electronic devices based on a single X-ray image (e.g., a top-down X-ray image, a bottom-up X-ray image, or an X-ray image captured at any suitable angle). The system may determine material thickness of one or more elements of interest (e.g., solder balls, contacts, connections, pins, joints, etc.) within a PCB board or electronic package in the orthogonal direction to the image plane (or a reference plane of the inspected device) based on a single X-ray image (e.g., a top-down X-ray image, a bottom-up X-ray image, or an X-ray image captured at any suitable angle). For example, the system may determine the material thickness based on variation in X-ray absorption as represented by variation of image grayscale values. The system may use computer vision and computational analysis technologies to determine the material thickness distribution (e.g., profile or shape of associated elements of interest) based on one or more features in the single image (e.g., edges, shapes, gradients, trends, grayscale values, etc.). Since defective solder joints exhibit differences in shape from acceptable solder joints, particular embodiments of the system may use the variation in grayscale values to differentiate between defective and acceptable solder joints. For example, the system may use a machine-learning (ML) model, which is trained by historical data, to identify and locate one or more elements of interest in the X-ray images, isolate the elements of interest from other interfering elements (e.g., elements of the same or other layers that may overlap or intersect the elements of interest) in the X-ray images, and identify one or more features (e.g., good connections, connections with different types of defects, etc.) associated with the elements of interest (e.g., connections, solder balls, PCB layers, etc.) based on a single X-ray image (e.g., a top-down X-ray image, a bottom-up X-ray image, or an X-ray image captured at any suitable angle).

In particular embodiments, the system may generate a second X-ray image for the inspected device from an oblique angle (or any suitable angle) to the image plane or device reference plane and use this second X-ray image to determine one or more features (e.g., staking order of multiple layers) and parameters (e.g., material thickness, shapes, sizes, distances, relative positions, profile variations, gradients, etc.) in addition to the first X-ray image (e.g., a top-down X-ray image, a bottom-up X-ray image, or an X-ray image captured at any suitable angle). For example, the system may use computer vision and computational analysis techniques to process a first X-ray image captured at a first angle (e.g., a substantially orthogonal to a plane of the inspected sample) and a second image generated from a second angle (e.g., an oblique angle) to determine the stacking order of multiple layers of a PCB board and/or compute the distances between features in the orthogonal direction to the image plane or device reference plane. With a given angle of the oblique direction, the system may identify and measure the features along the axis orthogonal to the image plane or the device refence plane, the relative displacements of features, and/or the distances between the features in the orthogonal direction.

By eliminating the need for large quantity of slice images, particular embodiments of the system may measure the material thickness of features and the distances between features in the orthogonal direction at a high speed, and therefore allow electronics manufacturers to measure and control (e.g., in-situ and/or inline) the electronics manufacturing process to have a much lower defective rate. For applications that require screening hundreds or thousands of solder joints in a single integrated circuit package, particular embodiments of the system dramatically reduce the inspection time (e.g., from hours to a few seconds), and dramatically improve the inspection speed of the inspection process. For example, particular embodiments of the system may take a few seconds or less to generate a single image to perform the inspection while the traditional CT system may take many hours to create images that can be used for defect detection. In particular embodiments, the system may generate X-ray images at least 100 times faster than traditional CT system and the inspection algorithm (e.g., machine-learning models) may inspect samples at least 1000 times faster than the traditional CT system. In addition, particular embodiments of the system may be capable of inspecting electronic components or devices with a much larger size than those of the traditional CT system. Particular embodiments of the system may be capable of inspecting every electrical connection in a product with number of inspection points per square inch with a throughput of 2 inches by 2 inches per minute.

FIG. 2A illustrates an example process for measuring material thickness and shape of an element of interest 4802 within a PCB board layer 4801 (along an orthogonal direction of the PCB board layer 4801). In particular embodiments, the automated high-speed X-ray inspection system as described in this disclosure may inspect electronic components or devices to determine one or more features (e.g., material thickness, shapes, sizes, distances, relative positions, profile variations, gradients, etc.) of one or more elements of interest (e.g., connections, solder balls, PCB layers, etc.) based on a single X-ray image (e.g., a top-down X-ray image, a bottom-up X-ray image, or an X-ray image captured at any suitable angle). As an example and not by way of limitation, the automated high-speed X-ray inspection system may generate a top-down X-ray image to measure the material thickness 4815 of an element of interest 4802 within a PCB board layer 4801. The element 4802 may be a solid cylinder body made up of metal materials (e.g., solder materials, cooper, or any other metal materials), which absorb and/or block X-ray beams. The element 4802 may have a circular top view shape 4803 which may be captured by a top-down X-ray image because of X-ray absorption effect.

In particular embodiments, for determining the shape of the element 4802 and measuring the material thickness of the cylinder along the orthogonal direction 4809 of the PCB board layer 4801, the system may determine a signal curve 4804 for the X-ray signal level as received by the X-ray detector. The X-ray signal curve 4804 may correspond to the center line 4807 of the circular top view shape 4803 within the plane of the PCB board layer 4801 and may be determined based on the grayscale values of the top-down X-ray image along the center line 4807. The signal amplitude at the bottom portion 4806 of the X-ray signal curve 4804 may be correlated to the X-ray absorption rate of the cylinder material of the element 4802 and the material thickness 4815. The signal amplitude of the surrounding portion 4805 of the X-ray signal curve 4804 may be correlated to the X-ray absorption rate of the PCB board layer 4801 surrounding the element 4802. The signal curve edges 4813 and 4814 of the X-ray signal curve 4804 may correspond to the edges 4811 and 4812 of the cylinder element 4802, respectively.

In particular embodiments, the system may determine the material thickness 4815 of the cylinder element 4802 based on the signal amplitudes of the bottom portion 4806 and the surrounding portion 4805 of the X-ray signal curve 4804. The system may determine the shape, size, and/or position of the element 4802 based on the top view shape 4803, the edges 4813 and 4814, and the overall profile of the X-ray signal curve 4804. For example, the system may determine that the element 4802 has sharp edges 4811 and 4812 because the X-ray signal curve 4804 has the sharp edges 4813 and 4814. As another example, the system may determine the diameter of the top surface of the cylinder element 4802 based on the width of the bottom portion 4806 of the X-ray signal curve 4804. As yet another example, the system may determine the lateral position of the element 4802 within the plane of the PCB board layer 4801 based on the relative positions of the bottom portion 4806 with respect to the surrounding portions 4805 of the X-ray signal curve 4804. It is notable that the cylinder element as described here is for example purposes only, and the elements that can be measured is not limited thereof. The measured elements can have any suitable shapes, any suitable sizes, and any suitable positions. It is notable that the X-ray signal curve as described here is for example purposes only, and the X-ray signal curve is not limited thereof. The X-ray signal curves may be determined based on any line of pixels across the top view shape or any line of pixels in the top-down image.

FIG. 2B illustrates an example process for inspecting a solder ball 4822 within a PCB board layer 4821 based on a single X-ray image. In particular embodiments, the X-ray imaging system may detect and determine a good solder ball by measuring one or more parameters or features related to the solder ball (e.g., material thickness, shapes, sizes, positions, relative placements to other components, etc.) based on a single X-ray image (e.g., a top-down X-ray image, a bottom-up X-ray image, or an X-ray image captured at any suitable angle). As an example and not by way of limitation, the X-ray imaging system may generate a top-down X-ray image from the substantially orthogonal direction 4839 of the PCB board layer 4821 for the solder ball 4822 within the PCB board layer 4821. The top-down X-ray image may capture the top view shape 4823 of the solder ball 4822 because of the X-ray absorption by the solder material. The top view shape 4823 of the solder ball 4822 may include two circular shapes whose circular edges correspond to the curved edges of 4831 and 4832 of the solder ball 4822.

In particular embodiments, for determining one or more features (e.g., material thickness, shapes, sizes, positions, relative placements to other components, etc.) associated with the solder ball 4822, the system may determine a signal curve 4824 for the X-ray signal level as received by the X-ray detector. The X-ray signal curve 4824 may correspond to the center line 4827 of the top surface of the solder ball 4822 within the plane of the PCB board layer 4821. The X-ray signal curve 4824 may be determined based on the grayscale values of the top-down X-ray image along the center line 4827 of the solder ball's top surface. The signal amplitude at the bottom portion 4826 of the X-ray signal curve 4824 may be correlated to the X-ray absorption rate of the solder material and the material thickness. The signal amplitude of the surrounding portion 4825 of the X-ray signal curve 4824 may be correlated to the X-ray absorption rate of the PCB board layer area surrounding the solder ball 4822. The signal curve edges 4833 and 4834 of the X-ray signal curve 4824 may correspond to the edges 4831 and 4832 of the solder ball 4822, respectively.

In particular embodiments, the system may determine the material thickness, shapes, sizes, positions, and/or relative placements to other components of the solder ball 4822 based on the top view shape 4823, the edges 4833 and 4834, the amplitude values, and the overall profile of the X-ray signal curve 4824. For example, the system may determine that the solder ball has a good solder connection based on the flatness of the bottom portion 4826 of the signal curve 4824 (which indicates that both the top surface and bottom surface of the solder ball 4822 are flat). As another example, the system may determine the maximum and minimum circle diameters of the solder ball 4822 based on the diameters of the circular top view shapes 4823. As yet another example, the system may determine the lateral position of the solder ball 4822 within the plane of the PCB board layer 4821 based on the relative positions of the bottom portion 4826 to the surrounding portions 4825 of the X-ray signal curve 4824. As yet another example, the system may determine the edge shapes (e.g., 4831, 4832) of the solder ball 4822 based on the shapes of the X-ray signal edges 4833 and 4834.

Figure 2D:
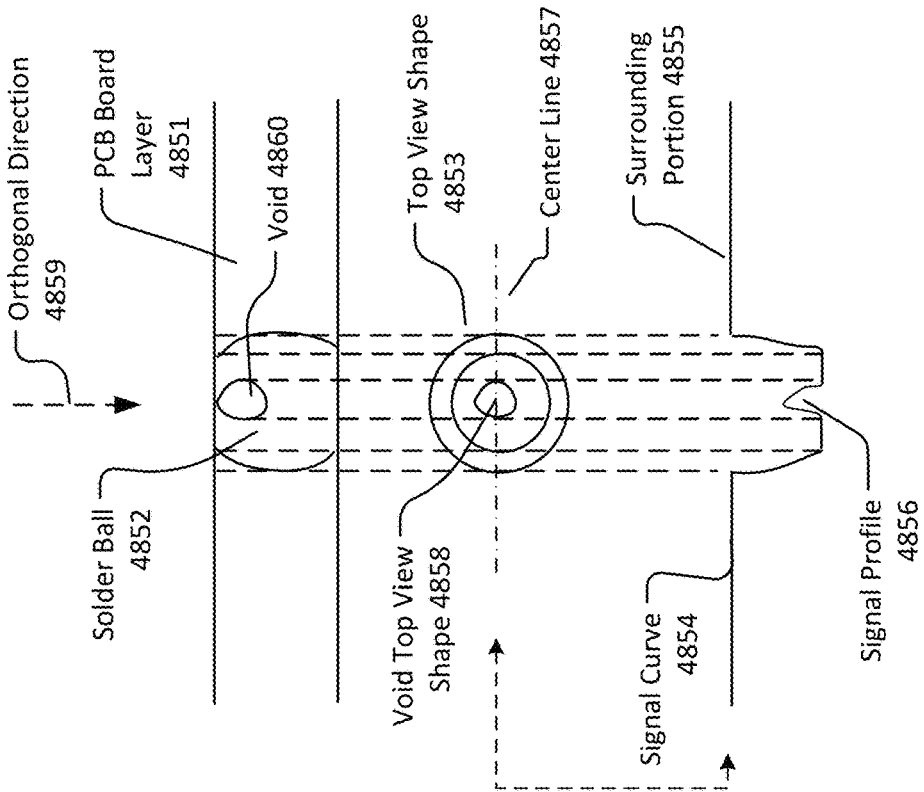
FIG. 2D illustrates an example process for detecting a void within a defective solder ball within a PCB board layer based on a single X-ray image.
Figure 2C:
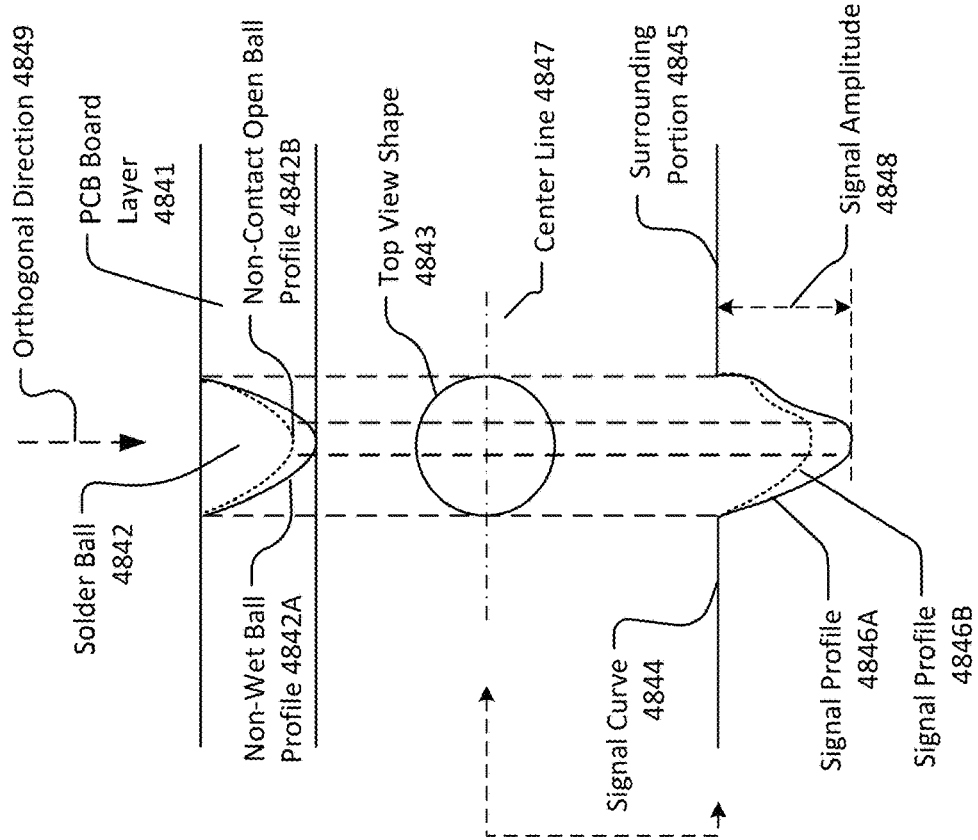
FIG. 2C illustrates an example process for detecting a defective solder ball (e.g., non-wet defect or non-wet open defect) within a PCB board layer based on a single X-ray image.

FIG. 2C illustrates an example process for detecting a defective solder ball 4842 (e.g., non-wet defect or non-wet open defect) within a PCB board layer 4841 based on a single X-ray image. In particular embodiments, the X-ray imaging system may detect and determine a defective solder ball by measuring one or more parameters or features related to the solder ball (e.g., material thickness, shapes, sizes, positions, relative placements to other components, etc.) based on a single X-ray image (e.g., a top-down X-ray image, a bottom-up X-ray image, or an X-ray image captured at any suitable angle). As an example and not by way of limitation, the X-ray imaging system may generate a top-down X-ray image from a substantially orthogonal direction 4849 of the PCB board layer 4841 for the solder ball 4842 within the PCB board layer 4841. The top-down X-ray image may capture the top view shape 4843 of the solder ball 4842 because of the X-ray absorption by the solder material. The top view shape 4843 of the solder ball 4842 may include a circular shape as determined by the top surface shape of solder ball 4842. As another example and not by way of limitation, the X-ray imaging system may generate an X-ray image from any suitable direction or angle with respect to the PCB board layer 4841 for the solder ball 4842 within the PCB board layer 4841. The X-ray image may capture the shape of the solder ball 4842 from the particular angle at which the X-ray image is captured because of the X-ray absorption by the solder material. The shape of the solder ball 4842 as captured in the X-ray image may include an elliptic or a substantially circular shape as determined by the surface shape of solder ball 4842 as seen from that particular angle at which the X-ray image is captured.

In particular embodiments, for determining one or more features (e.g., material thickness, shapes, sizes, positions, relative placements to other components, etc.) associated with the solder ball 4842, the system may determine a signal curve 4844 for the X-ray signal level as received by the X-ray detector. The X-ray signal curve 4844 may correspond to the center line 4847 of the top surface of the solder ball 4842 within the plane of the PCB board layer 4841. The X-ray signal curve 4844 may be determined based on the grayscale values of the top-down X-ray image along the center line 4847 of the solder ball's top surface. The signal amplitudes and signal profiles (e.g., 4846A and 4846B) of the X-ray signal curve 4844 at the portion corresponding to the solder ball 4824 may be correlated to the X-ray absorption rate of the solder material and the profile of the solder ball (e.g., non-wet ball profile 4842A or non-contact open ball profile 4842B). The material thickness of the solder ball 4842 may be correlated to the signal amplitude of the corresponding portion of the X-ray signal curve 4844.

In particular embodiments, the system may determine the material thickness, shapes, sizes, positions, and/or relative placements to other components of the solder ball 4842 based on the top view shape 4843, the signal profiles 4846A and 4846B associated with amplitude values, and the overall X-ray signal curve 4844. For example, the system may determine that the solder ball 4842 has a non-wet defect (e.g., 4842A) based on the signal profile 4846A of the corresponding signal portion. The system may determine that, although having non-wet defect, the solder ball 4842 may be partially connected to the component corresponding to the bottom surface of the PCB layer 4841, based on the signal amplitude 4848 and the signal profile 4846A (which has a small flat part). As another example, the system may determine that the solder ball 4842 has a non-contact open defect (e.g., 4842B) based on a determination that the signal amplitude at the bottom point of the signal profile 4846B does not meet a corresponding amplitude threshold (e.g., signal amplitude 4848). As yet another example, the system may determine the profiles (e.g., 4842A, 4842B) the solder ball 4822 based on the corresponding signal profiles (e.g., 4846A, 4846B) of the X-ray signal 4844 with gradually changing amplitudes.

FIG. 2D illustrates an example process for detecting a void 4860 within a defective solder ball 4852 within a PCB board layer 4851 based on a single X-ray image. In particular embodiments, the X-ray imaging system may detect a void within a defective solder ball based on X-ray signal level as received by the X-ray detector and top view shapes as captured in a single X-ray image (e.g., a top-down X-ray image, a bottom-up X-ray image, or an X-ray image captured from any suitable angle). As an example and not by way of limitation, the X-ray imaging system may generate a top-down X-ray image from the orthogonal direction 4859 of the PCB board layer 4851 for the solder ball 4852 within the PCB board layer 4851. The top-down X-ray image may capture the top view shape 4853 of the solder ball 4852 because of the X-ray absorption by the solder material. The top view shape 4853 of the solder ball 4852 may include an area with a shape corresponding to the top view shape 4858 of the void 4860.

In particular embodiments, for detecting the void 4860, the system may determine a signal curve 4854 for the X-ray signal level as received by the X-ray detector. The X-ray signal curve 4854 may correspond to the center line 4857 of the top surface of the solder ball 4852 within the plane of the PCB board layer 4851. The X-ray signal curve 4854 may be determined based on the grayscale values of the top-down X-ray image along the center line 4857 of the solder ball's top surface. The X-ray signal curve 4854 may include a standing-out portion (e.g., signal profile 4856) corresponding the void area within the solder ball because lacking solder material in the void area may reduce the X-ray absorption by the solder ball 4853. The standing-out portion may have signal amplitudes higher than directly surrounding portions. In particular embodiments, the system may determine that the solder ball 4852 as a defective solder ball for having a void 4860 based on the determination that the X-ray signal curve 4854 has a standing-out portion at the signal portion corresponding to the solder ball 4852. In particular embodiments, the system may determine the size, shape, and/or location of the void 4860 based on the size, shape, and/or position of the sanding-out portion with respect to the other portions of the X-ray signal curve 4854.

Figure 2F:
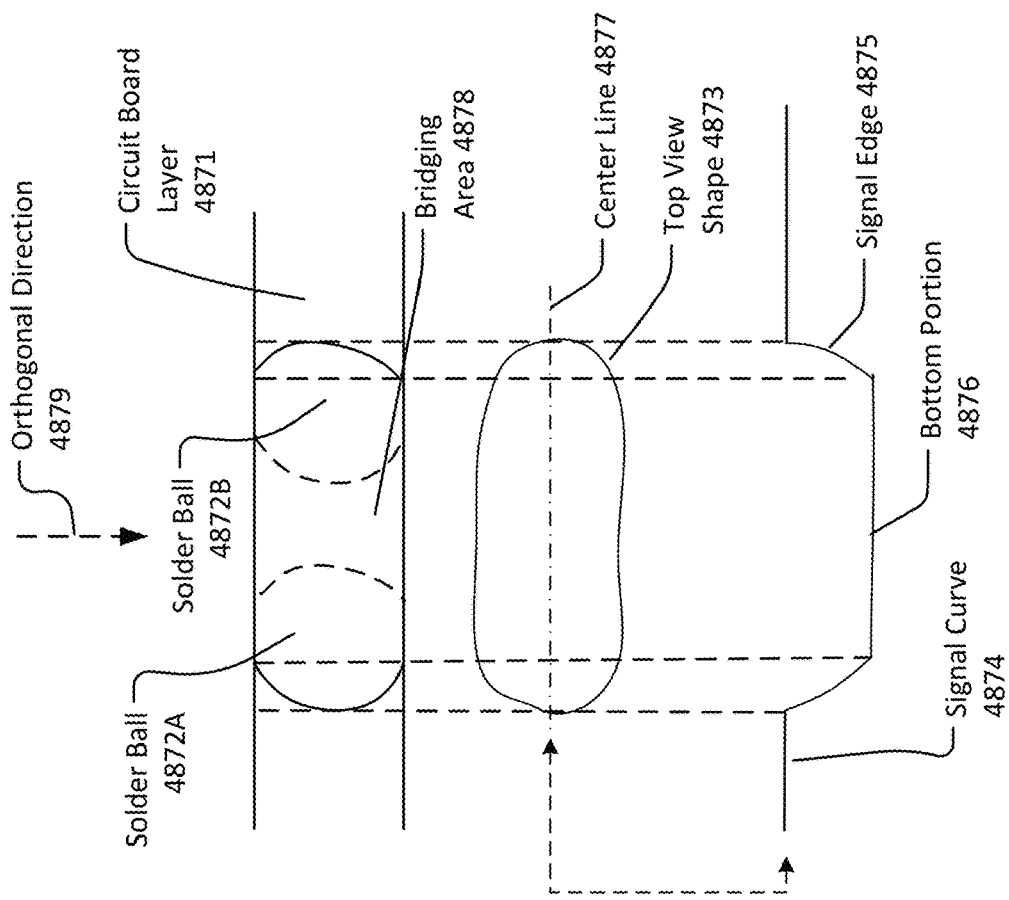
FIG. 2F illustrates an example process for detecting two defective balls which are connected by a bridging area based on a single X-ray image.
Figure 2E:
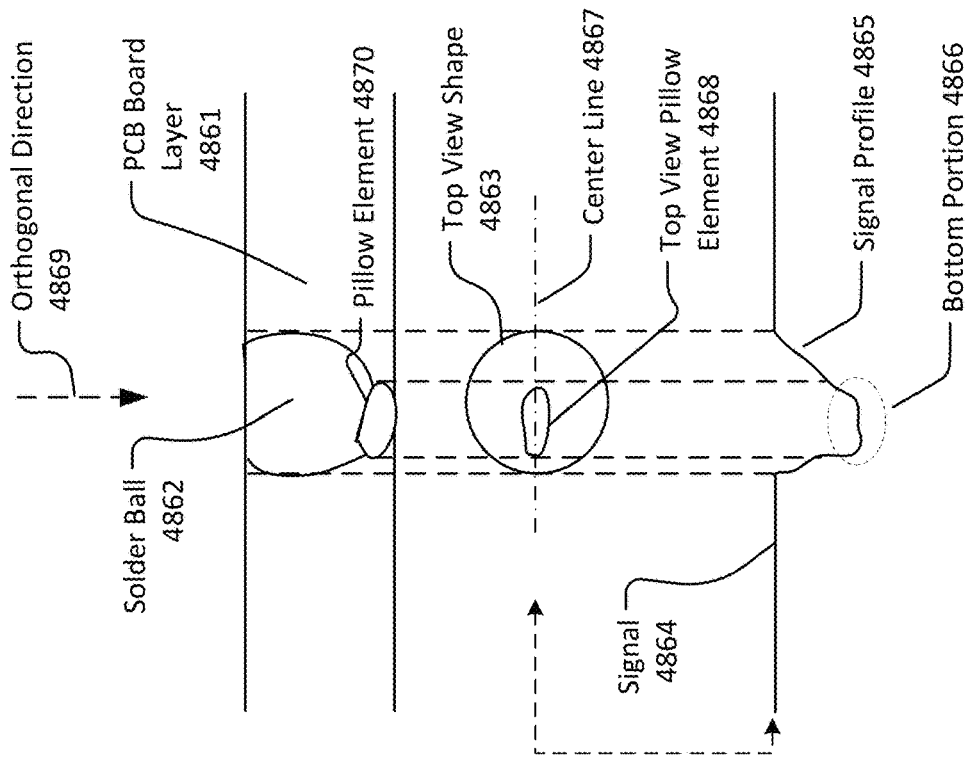
FIG. 2E illustrates an example process for detecting a defective solder ball with a head-in-pillow defect within a PCB board layer based on a single X-ray image.

FIG. 2E illustrates an example process for detecting a defective solder ball 4862 with a head-in-pillow defect within a PCB board layer 4861 based on a single X-ray image. As an example and not by way of limitation, the X-ray imaging system may generate a top-down X-ray image from the orthogonal direction 4869 of the PCB board layer 4861 for the solder ball 4862. The solder ball 4862 may include a pillow element 4870 which is part of the associated head-in-pillow defect. The top-down X-ray image may capture the top view shape 4863 of the solder ball 4852 because of the X-ray absorption effect of the solder material. The top view shape 4863 of the solder ball 4852 may include an area corresponding to the top view pillow element shape 4868 of the pillow element 4867. In particular embodiments, for detecting head-in-pillow defects, the system may determine a signal curve 4864 for the X-ray signal level as received by the X-ray detector. The X-ray signal curve 4864 may correspond to the center line 4867 of the top surface of the solder ball 4862 within the plane of the PCB board layer 4861. The X-ray signal curve 4864 may be determined based on the grayscale values of the top-down X-ray image along the center line 4867 of the solder ball's top surface. The X-ray signal curve 4864 may include a bottom portion 4866 corresponding the pillow element 4670 of the solder ball 6862. The bottom portion 4866 may have signal amplitudes relatively lower than the directly surrounding portions because of the increased X-ray absorption caused by the pillow element 4870. In particular embodiments, the system may determine that the solder ball 4852 is a defective solder ball for having a head-in-pillow defect based on the bottom portion 4866 of the X-ray signal curve 4864 and the top view shape 4863 including the top view pillow element 4868. In particular embodiments, the system may determine the size, shape, and/or location of the pillow element 4870 based on the amplitude values, width, shape, and/or position of the bottom portion 4866 of the X-ray signal curve 4862 with respect to the other portions of the X-ray signal curve 4862.

FIG. 2F illustrates an example process for detecting two defective balls 4862, which are connected by a bridging area 4878, based on a single X-ray image. As an example and not by way of limitation, the X-ray imaging system may generate a top-down X-ray image from the orthogonal direction 4879 of the PCB board layer 4871 for the solder balls 4872A and 4872B. The solder balls 4872A and 4872B may be defectively connected by a bridging area 4878 made up of solder material and become shorted-circuit. The top-down X-ray image may capture the top view shape 4873 of the two shorted solder balls 4872A and 4872B because of the X-ray absorption effect of the solder material. In particular embodiments, for detecting bridged or shorted solder balls, the system may determine a signal curve 4874 for the X-ray signal level as received by the X-ray detector. The X-ray signal curve 4874 may correspond to the center line 4873 of the top surface of the two solder balls 4872A and 4872B within the plane of the PCB board layer 4871. The X-ray signal curve 4874 may be determined based on the grayscale values of the top-down X-ray image along the center line 4877 of the solder balls' top surface. The X-ray signal curve 4874 may include a bottom portion 4876 corresponding the bridged solder balls 6872A and 6872B. The bottom portion 4876 may be wider than a single solder ball and cover the width of two or more solder balls. The system may determine that the two solder balls 4872A and 4872B are bridged or shorted based on the signal profile of the signal curve 4874 and the top view shape 4873. The system may determine the width of the bridging area 4878 based on the width of the bottom portion 4876 of the X-ray signal curve 4874.

Figure 2G:
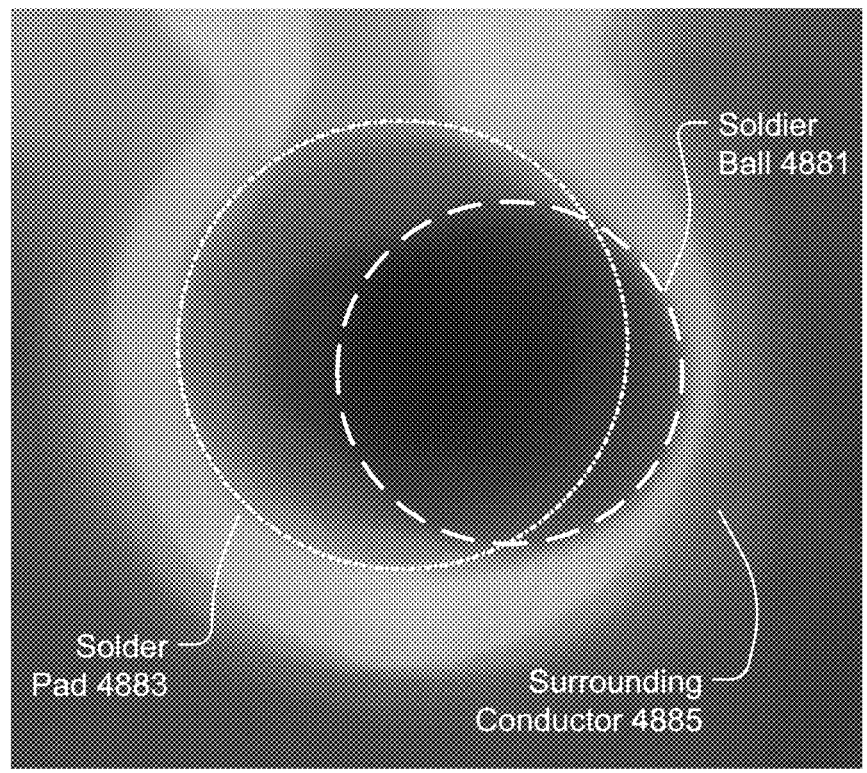
FIG. 2G illustrates an example top-down X-ray image for detecting a defective solder ball which is misaligned with the solder pad.

FIG. 2G illustrates an example top-down X-ray image for detecting a defective solder ball which is misaligned with the solder pad. As shown in FIG. 2G, the top-down X-ray image may include the top views for the solder pad 4883, the solder ball 4881, and the surrounding conductor 4885. The solder ball 4881 may be located at a position that is misaligned to the solder pad 4883 and may be very close to the surrounding conductor 4885. Although the misaligned solder ball 4881 does not touch the surrounding conductor 4885, it might still cause problem for the component or device containing this misaligned solder ball. For example, the local impedance in this area may be changed by this misaligned solder ball and may cause functional problems to the host components or devices. As another example, the host components or devices may have a reliability problem because of the short distance between the misaligned solder ball 4885 and the surrounding conductor 4881. In particular embodiments, the system may identify the misaligned solder pad 4881 and generate an alert for the system operator when the distance between the misaligned solder ball 4881 and the solder pad 4883 is a above a threshold distance or the distance between the misaligned solder ball 4881 and the surrounding conductor 4885 is below a threshold distance. In particular embodiments, the system may quantitively measure the misaligned distance between the solder ball 4881 and solder pad 4883 and the distance between the solder ball 4881 and the surrounding conductor 4885 based on the top-down X-ray image using the X-ray signal level curve as described in earlier sections of this disclosure.

It is notable that the solder balls as described in FIGS. 2B-2G are for example purposes only, and the solder balls and associated defects that can be detected and measured by particular embodiments of the system are not limited thereof. In particular embodiments, the automated high-speed X-ray inspection system may detect and measure, for example, but not limited to, good solder connections, solder balls with voids, non-wet solder balls, non-contact open solder balls, solder balls with head-in-pillow defects, solder balls with misaligned positions, over size solder balls, under size solder balls, or any other types of defects. It is notable that the automated high-speed X-ray inspection system is not limited for inspecting and measuring solder connections. In particular embodiments, the automated high-speed X-ray inspection system may inspect and measure elements or components including, for example, but not limited to, electrical connections, elements or components with micro-structures, PCB layers, plates, via, metal strips, wires, sensors or actuators with micro-structures, etc. In this disclosure, the top-down X-ray image or bottom-up X-ray image may refer to an X-ray image captured along a direction that is substantially orthogonal to a plane of the inspected sample. It is notable that the top-down X-ray image captured at the substantially orthogonal direction of the PCB layer is for example purposes only, and the X-ray image is not limited thereof. In particular embodiments, the X-ray imaging system may generate one or more X-ray images in any suitable directions (e.g., at any zenith angles and any azimuth angles with respect to the PCB board surface or reference plane) and perform inspection and defect detection based on the generated X-ray image. In particular embodiments, the single X-ray image used by the system to detect defects in the inspected sample may be a top-down X-ray image, a bottom-up X-ray image, or an X-ray image captured at any suitable angle with respect to the inspected sample.

FIGS. 3A-3B illustrate an example process for measuring one or more features along the orthogonal direction (along Z-axis) of the inspected component based on two or more X-ray images captured from different angles. In particular embodiments, the system may capture a first X-ray image at a first view angle and capture a second X-ray image at a second view angle different from the first view angle. Then, the system may determine one or more features (e.g., sizes, shapes, relative positions, stacking orders, distances, etc.) of one or more elements along both orthogonal direction and lateral direction of the inspected component. As an example and not by way of limitation, the PCB board layer 4900 may include two cylinder elements 4901 and 4902 made up of X-ray absorbing materials (e.g., metals, solder materials, etc.). The two cylinder elements 4901 and 4902 may have their center axis being aligned to each other along the Z-axis 4903. The system may generate a first X-ray image which is a top-down image with the X-ray beam direction being aligned with the orthogonal direction (along the Z-axis 4903), as shown in FIG. 3A. The system may generate a second X-ray image from an oblique direction 4907 which has an angle 4908 to the Z-axis 4903.

The first X-ray image may capture the top view shapes 4904A and 4905A of the respective cylinder elements 4901 and 4902. The top view shapes of 4904A and 4905A may be two co-centered circular shapes as shown in FIG. 3A. The second X-ray image may capture the shapes 4904B and 4905B of the respective cylinder elements as viewed from the oblique direction 4907. When viewed from the oblique direction 4907, both elements 4901 and 4902 may have shapes (e.g., 4904B, 4905B), sizes, and/or locations that are different from as viewed from the orthogonal direction 4903. For example, the shape 4905B of the element 4902 as viewed from the oblique direction 4907 could be an ellipse with a longer axis along the lateral direction. The ellipse shape 4905B may have a longer lateral axis than the top view shape 4905A and may be located at different location to the top view shape 4905A (moved to left side in this example). The shape 4904B of the element 4901 as viewed from the oblique direction 4907 could be an ellipse which may have a distance 4906 to the Z-axis centerline 4903 of the elements 4901 and 4902.

In particular embodiments, the system may use the first and second X-ray images to determine one or more features associated with the two elements 4901 and 4902 along the Z-axis 4903. As an example and not by way of limitation, the system may determine the distance 4910 between the element 4901 and 4902 along the Z-axis based the distance 4906 (which is between the oblique direction shape 4904B and the Z-axis 4903) and the angle 4908 of the oblique direction 4907. As another example, the system may determine the shapes of the elements 4901 and 4902 based on the top view shapes (e.g., 4904A, 4905A) and the oblique direction shapes (e.g., 4904B, 4905B). As yet another example, the system may determine the stacking order of the elements 4901 and 4902 based on the top view shapes (e.g., 4904A, 4905A) and the oblique direction shapes (e.g., 4904B, 4905B).

It is notable that the cylinder elements as described here are for example purposes only, and the elements that can be inspected by the automated high-speed X-ray inspection system are not limited thereof. For example, the elements that can be inspected by the automated high-speed X-ray inspection system may have any shapes, any sizes, any relative positions, or any number of elements. As long as the elements to be inspected can absorb X-ray beams, the X-ray imaging system as described in this disclosure may be applicable to inspect those elements. It is notable that the X-ray images captured from the orthogonal direction along the Z-axis and the oblique direction are for example purposes only, and the direction of X-ray images are not limited thereof. Particular embodiments of the system may generate X-ray image from any suitable direction with any zenith angle or/and azimuth angle, and determine the features in the orthogonal direction (along the Z-axis) or/and lateral direction based on those X-ray images. For example, the system may determine the features along the orthogonal and lateral direction based on a first X-ray image generated from a first oblique direction and a second X-ray image generated from a second oblique direction that is different from the first oblique direction. As another example, the system may generate two or more X-ray images, each from a different direction (e.g., orthogonal direction or oblique direction) and determine the one or more features along the orthogonal direction or/and the lateral direction based on the two or more X-ray images generated from different directions.

In particular embodiments, the X-ray imaging system may determine one or more features (e.g., sizes, shapes, relative positions, stacking orders, distances, etc.) of one or more elements of interest in the orthogonal direction along the Z-axis based on one or more X-ray images generated from different directions or angles. The system may determine these features without generating a large number of X-ray images (e.g., for each slice) for cross sections as the traditional CT technologies, and therefore greatly improve the inspection speed.

In particular embodiments, the system may determine one or more features (e.g., edges, shapes, sizes, grayscale values, gradients, trends, etc.) of the inspected elements based on one or more features or attributes of a group of grayscale values in the X-ray images. For example, a sharp edge in the X-ray image may correspond to a sharp edge of the element along the X-ray direction from which this particular X-ray image is generated. As another example, an edge or shape with gradually changing grayscale values may correspond to a gradually changing edge or shape of the element. In particular embodiments, the system may include one or more X-ray detectors with high sensitivity and high resolution for generating X-ray images. For example, the X-ray images may have many more pixels (e.g., greater than or equal to 29 megapixels) than traditional CT systems (e.g., 1-2 megapixels). Each X-ray image pixel may have a larger number of grayscale levels (e.g., 10000 to 65000 grayscale levels), which provide a large dynamic range. Furthermore, the system may include a high power X-ray beam source (e.g., 1000 W) for better X-ray penetrating capability and better image quality. All these features (e.g., high resolution, large dynamic range, high power X-ray source) improve the system's capability for inspecting electronic device with high speed and high accuracy.

In particular embodiments, the system may include an automated process utilizing computer vision techniques and machine-learning (ML) to process the X-ray images, determine the related features, and determine one or more quality metrics (e.g., identifying defective solder balls) for the elements of interest. For example, the system may use computer vision techniques and ML models (which are trained using historical data) to identify and locate the elements of interest in the X-ray images. As another example, the system may use computer vision techniques and ML models to determine edges, shapes or profiles, changing gradients, dimensions or sizes, and other features or parameters in the X-ray images. The computer vision techniques and ML models may detect and identify one or more of these features based on subtle difference between the grayscale values (which may not be discernable by the human eye) taking advantage of the high resolution and large dynamic range of the X-ray images. As yet another example, the system may use computer vision techniques and machine-learning (ML) to determine one or more quality metrics and identify defective solder connections. As yet another example, the system may use computer vision techniques and machine-learning (ML) to classify the solder connections into good connections and various types of defects, as described in further detail herein.

In particular embodiments, the X-ray image may include a number of features (e.g., edges, shapes, shadows, etc.) that are not related to the elements of interest. For example, the inspected device may include a number of layers with each layer having a number of elements (e.g., solder balls, connection, strips, wires of other layers), which may overlap or intersect the elements of interest in an X-ray image that is generated from a particular direction or angle. These interfering features may create technical difficulties by introducing noise which interferes the identifying and locating the elements of interest and related features. In particular embodiments, the system may use the ML model to remove or reduce the influence from these interfering features. For example, the ML model may be trained by historical data (e.g., labeled data or unlabeled data) to identify a particular element of interest at a particular layer from the X-ray images containing veracious types of interfering features and elements. As another example, the ML model may be trained to isolate the elements of interest from the interfering features and elements in X-ray images. In particular embodiments, the system may use the computer vision techniques and ML models to isolate the elements of interests from the interfering features or elements based on one or more characteristics. For example, the wires or conductor strips of a PCB board may have particular shapes (e.g., strip-shape with clear edges and uniform thickness), sizes, and/or dimensions. As yet another example, the solder pad may have a circular shape with particular sizes and may be located at particular locations (e.g., based on information accessed from a design blueprint).

In particular embodiments, the automated high-speed X-ray inspection system may be used in electronics manufacturing process to identify defective structures of electronic components that cannot be inspected by optical cameras based on visible light. For example, the automated high-speed X-ray inspection system may inspect solder joints in flip chip or ball grid array packaging where the features of interest are obstructed by other components in the part. In particular embodiments, the automated high-speed X-ray inspection system may be capable of inspecting a wide range of problems associated with the inspected electronic components or devices including, for example, but not limited to, die chipping or cracking, standing or tomb stoning components, component misplacements, component misalignments, missing components, solder wetting (e.g., over-wet, non-wet), solder bridging (e.g., short), surface-mounted component cracking, extra components, double components, rotated components, die tilting, non-wet copper connections, non-wet solders for surface-mounted components, insufficient solder for surface-mounted components, shorted surface-mounted connections, PCB via voids, solder voids, top and bottom assemblies, embedded components, stack dies, die attachment coverages, etc.

[Defect Detection Based on Brightness Number and Wetting Metric]

In particular embodiments, the automated high-speed X-ray inspection system may determine a brightness number or a brightness metric for the solder contact and identify the defective solder contacts based at least in part on the determined brightness number. In particular embodiments, the brightness number or brightness metric of a solder contact may be based on a gray level of a pixel or a gray level determined based on a group of pixels associated with that solder contact. For example, in a reference image, the gray level may be 10,000, and in the part under test, the corresponding gray level may be 12,000 or 8,000. It is notable that the brightness metric may be determined based on a combination of pixels, or a value calculated from a formula based on a combination of pixels (e.g., based on convolution with a kernel or a moment). In general, the reference images and images of the inspected parts may be processed to determine the corresponding brightness metrics before the comparison is made. As an example and not by way of limitation, the automated high-speed X-ray inspection system may capture a number of X-ray images for a number of solder contacts. The system may determine a brightness number for each solder contact (e.g., using AI or ML models). The system may compare the brightness numbers to one or more criteria (e.g., pre-determined thresholds) and identify the solder contacts associated with brightness numbers that fail to meet one or more of the criteria as defective contacts. As another example and not by way of limitation, the automated high-speed X-ray inspection system may capture a number of X-ray images for a number of solder contacts. The system may determine a brightness number for each solder contact (e.g., using AI or ML models). The system may compare the brightness numbers of a number of solder contacts to identify the solder contacts having brightness numbers deviated from an average value or a reference value for a threshold distance. The large deviation of the brightness number may indicate defects in the solder contacts. The system may identify the solder contacts associated with the deviated brightness numbers as defective solder contacts.

In particular embodiments, the automated high-speed X-ray inspection system may extract a wetting metric for each solder contact captured in X-ray images and identify the defective solder contacts based at least in part on the extracted wetting metrics. In particular embodiments, the wetting metric may be determined based on a degree of wetting related to the adhesion of the solder to the adjacent object, such as a metal pad or another piece of solder. The wetting metric may be indicated by and determined based on the angle between the solder and the other object. An acute angle may indicate good wetting, whereas an obtuse angle may indicate poor wetting. The wetting may vary from location to location even within a single solder connection and the degree of wetting may vary from 0% (no wetting) to 100% (wetting along the entire edge of the solder connection). As an example and not by way of limitation, the automated high-speed X-ray inspection system may capture a number of images for a number of solder contacts. The system may determine a wetting metric for each solder contact (e.g., using AI or ML models) captured in the X-ray images. The system may compare the wetting metrics to one or more criteria (e.g., pre-determined thresholds) and identify the solder contacts that are associated with wetting metrics failing to meet one or more of the criteria as defective solder contacts. As another example and not by way of limitation, the automated high-speed X-ray inspection system may capture a number of X-ray images for a number of solder contacts. The system may determine a wetting metric for each solder contact (e.g., using AI or ML models) captured in the X-ray images. The system may compare the wetting metrics of a number of solder contacts to identify the solder contacts having wetting metrics deviated from an average value or a reference value of the wetting metrics for a threshold distance. The large deviation of the wetting metric may indicate defects in the solder contacts. The system may identify the solder contacts associated with the deviated wetting metrics as defective solder contacts. In particular embodiments, the degree of wetting may be determined by measuring the geometric configuration of the solder as determined by the grayscale level of pixels associated with the solder connection. For example, a smaller and darker area of solder may indicate a narrower and taller solder connection indicating less wetting (i.e., a lower degree of wetting). As another example, a wider and less-dark area of solder may indicate a wider and shorter solder connection indicating better wetting (i.e., a higher degree of wetting). Additional factors such as the location of the solder with respect to a pad or copper pillar may also indicate good or poor wetting.

[Spectrum-Specific X-Ray Filters for X-Ray Source]

In particular embodiments, the automated high-speed X-ray inspection system may use a single X-ray image (e.g., a top-down X-ray image, a bottom-up X-ray image, or an X-ray image captured from any suitable angle) generated with broad spectral X-ray beam (e.g., X-ray beam having a white spectrum) to identify defects in the inspected samples. In particular embodiments, the automated high-speed X-ray inspection system may use multiple images each of which may be generated from the same angle/direction with a narrower X-ray spectrum than the white spectrum. In particular embodiments, the automated high-speed X-ray inspection system may include an X-ray source emitting an X-ray beam having a white spectrum (i.e., a continuous spectrum of X-rays). In particular embodiments, the automated high-speed X-ray inspection system may include one or more X-ray filters each of which may be capable for filtering out a particular spectrum range of the X-ray beam. The inspected samples (e.g., electronic devices or components) may be made of different materials including, for example, but not limited to, copper, silver, gold, aluminum, alloys, palladium, nickel, lithium, tin, etc. Different materials may absorb X-ray beams of different spectrum ranges. In particular embodiments, the automated high-speed X-ray inspection system may include a number of X-ray filters corresponding to respective spectrum ranges that are absorbed by different materials. As an example and not by way of limitation, for inspecting solder joints made of a tin-lead alloy or a silver material, the images of the copper components (e.g., wires, vias, etc.) in the inspected samples may interfere the solder joints in the X-ray images. The automated high-speed X-ray inspection system may include a first X-ray filter corresponding to a first spectrum range that is absorbed by copper material. The automated high-speed X-ray inspection system may generate a first material selective X-ray image of the inspected samples by applying the first filter to the X-ray source. Since the X-ray spectrum that are absorbed by the copper material has been filtered out from the X-ray beam, the copper components in the inspected samples may become transparent to the filtered X-ray beam. As a result, the first material selective X-ray image may eliminate or reduce the interference from the copper components to the solder joints in the X-ray images, and therefore provide better X-ray image quality (e.g., better signal-to-noise ratios) for the inspected solder joints. In this disclosure, the "elements of interest in the inspected samples" may refer to the physical elements of interest of the inspected devices or components. The "elements of interest in an X-ray image" may refer to the corresponding images of the physical elements of interest as captured in the X-ray image.

As another example and not by way of limitation, for inspecting elements made of copper material, the elements made of other materials (e.g., silver, tin, lead, etc.) may interfere the elements of interest in the X-ray images. The automated high-speed X-ray inspection system may use a second X-ray filter corresponding to spectrum ranges that are absorbed by the materials other than copper (e.g., silver, tin, lead, etc.). The automated high-speed X-ray inspection system may generate a second material selective X-ray image with the second X-ray filter being applied to the X-ray source. The elements made of other materials may become transparent to the filtered X-ray beam. As a result, the second material selective X-ray image may eliminate or reduce the interference from other elements made of materials other than copper. In particular embodiments, the automated high-speed X-ray inspection system may identify an element of interest and associated defects based on each material selective X-ray image separately or based on two or more material selective X-ray images in combination.

In particular embodiments, the automated high-speed X-ray inspection system may generate an enhanced X-ray image by combining (e.g., adding, subtracting, superposition, etc.) two or more material selective X-ray images generated with different X-ray filters. The enhanced X-ray image may provide a better image quality for the element of interest by providing a higher signal-to-noise ratio than the X-ray images generated without using the X-ray filters. The automated high-speed X-ray inspection system may identify the elements of interest from one or more enhanced X-ray images, determine one or more features associated with the elements of interest, and identify one or more defects associated with the elements of interest. In particular embodiments, the automated high-speed X-ray inspection system may use a low energy X-ray filter for filtering out the low energy X-ray beams (which may cause damages to the inspected samples such as semiconductor devices) from the X-ray beam emitted by the X-ray source to avoid damaging the inspected samples.

[Multiple Spectrum-Specific X-Ray Sensors]

In particular embodiments, the automated high-speed X-ray inspection system may use multiple X-ray sensors in the X-ray detector with each X-ray sensor having a different sensitivity range of the X-ray spectrum. The automated high-speed X-ray inspection system may use the multiple X-ray sensors to measure X-ray of different spectrum ranges (which correspond to different photon energy levels). The automated high-speed X-ray inspection system may generate X-ray images of different X-ray spectrum ranges using respective X-ray sensors. The X-ray images of different X-ray spectrum ranges may provide different details for components made of different materials. For example, an X-ray image generated by an X-ray image sensor corresponding to a first X-ray spectrum range that is absorbed by copper material, may provide more detailed information about the copper elements (e.g., clearer images with higher signal-to-noise ratio). As another example, an X-ray image generated by an X-ray image sensor corresponding to a second X-ray spectrum that is absorbed by silver material, may provide more detailed information about silver elements (e.g., clearer images with higher signal-to-noise ratio) in the inspected samples.

In particular embodiments, the automated high-speed X-ray inspection system may identify an element of interest and one or more defects associated with that element of interest based on a single X-ray image of a particular X-ray spectrum range or a combination of two or more X-ray images of different X-ray spectrum ranges. For example, the automated high-speed X-ray inspection system may identify an element of interest made of silver material and one or more associated defects from a first X-ray image of a first X-ray spectrum range that is absorbed by silver material. As another example, the automated high-speed X-ray inspection system may identify an element of interest made of copper and one or more associated defects from a second X-ray image of a second X-ray spectrum range that is absorbed by copper material. In particular embodiments, the automated high-speed X-ray inspection system may perform subtraction or/and addition operations based on two or more X-ray images of different X-ray spectrum ranges to extract a higher level details about different materials of the inspected sample. The automated high-speed X-ray inspection system may provide a higher sensitivity for different materials (e.g., in a stack) by using multiple X-ray images of different X-ray spectrum ranges.

[Machine-Learning Model for Random Noise Variation]

In particular embodiments, the automated high-speed X-ray inspection system may use the grayscale variations in the X-ray images to identify defective solder joints. However, the inspected sample may include a number of interfering elements or patterns (e.g., copper wires, copper patterns, etc.). The interfering elements or patterns may interfere with the elements of interest (e.g., solder joints) in the X-ray images. The interfering images of the interfering elements may be noise factors that reduce the signal-to-noise ratio of the X-ray images and lead to errors in defecting defective solder joints (e.g., over rejections, false positive results, false negative results, etc.). For example, the interfering elements may attenuate the X-ray signals and result in losing dynamical range of the grayscale levels in the X-ray images for the elements of interest. As another example, the interfering elements (e.g., copper elements) may have a greater location tolerance than the elements of interests (e.g., solder joints) and may cause variations of the interfering patterns (e.g., sizes, positions, relative angles, etc.) which add additional difficulties for the system to identify the element of interest and associated defects. As described in earlier section of this disclosure, particular embodiments of the system may use spectrum-specific X-ray filters or spectrum-specific X-ray sensors to generate X-ray images that are selective to different materials to reduce the interfering noise and increase signal-to-noise ratio for the inspected elements of interest.

In particular embodiments, to identify the defective elements from the X-ray images which include the interfering noise or patterns, the automated high-speed X-ray inspection system may use one or more artificial intelligence algorithms (e.g., a machine-learning model, a nearest-neighbor correlation (NNC) model, a computer vision algorithm, etc.) to process the X-ray images and identify defective elements (e.g., defective solder joints). As an example and not by way of limitation, the automated high-speed X-ray inspection system may train the machine-learning model using a large number of samples (e.g., 10 K samples of the electronic devices or components). The machine-learning model may create an inspection model or reference model for the inspected samples based on the training population. Since the machine-learning model may be trained by a large sample population, the influence of the random noise in the X-ray images may be averaged out by the large sample population. The machine-learning model, after being trained, may effectively identify the defective elements of interest (e.g., defective solder joints) of the inspected sample based on the X-ray images including various types of interfering patterns (e.g., copper patterns). For example, the machine-learning model may extract a number of features or numeric attributes associated with the elements of interest in the inspected samples and identify whether there are defects associated with these elements of interest based on the extracted features.

[Reference Model Based on Neighboring Samples for Systematical Noise Variation]

In particular embodiments, the automated high-speed X-ray inspection system may use a computer vision algorithm to create a reference model for the samples of interest based on the nearest neighboring or adjacent samples. The automated high-speed X-ray inspection system may generate X-ray images for the neighboring samples or adjacent samples with respect to the sample of interest. The automated high-speed X-ray inspection system may generate a reference model based on the X-ray images of the neighboring samples and use the reference model as a baseline for inspecting the sample of interest. The automated high-speed X-ray inspection system may generate the X-ray image for the sample of interest and compare to the reference model to determine whether or not there are some defective elements in the sample of interest. By using the reference model created based on neighboring samples, the automated high-speed X-ray inspection system may eliminate or reduce the influence from the systematical noise or systematical interfering patterns in the X-ray images assuming that the samples nearby to each other may have the same or similar noise or interfering patterns. In particular embodiments, non-random noise or interfering patterns may vary based on a number of factors, such as, locations of the elements of interest, manufacturing processes of the samples, etc., and therefore may systematically influence the inspected samples. The reference model generated based on neighboring samples may effectively eliminate or reduce the influence from the systematical noise or errors.

As an example and not by way of limitation, the automated high-speed X-ray inspection system may generate X-ray images for a number of inspected samples including the sample of interest and its neighboring samples. The automated high-speed X-ray inspection system may create a reference model based on the X-ray images of a number of neighboring samples (e.g., two samples, three samples, or any suitable number of samples). The automated high-speed X-ray inspection system may process and integrate together the X-ray images of the neighboring samples to create the reference model as the inspection baseline assuming the neighboring samples are among the qualified samples with no defective elements. Then, the automated high-speed X-ray inspection system may compare the X-ray image of the sample of interest to the baseline to determine whether or not there are some defective elements in the sample of interest. The automated high-speed X-ray inspection system may determine that there is a defective element in the sample of interest when a difference between the sample of interest and the reference model is identified (e.g., greater than a difference threshold). The different may include, for example, but are not limited to, a position difference, a size difference, a pattern difference, a signature difference, a profile different, a grayscale value difference, etc. The automated high-speed X-ray inspection system may repeat this process (e.g., creating baseline models based on neighboring samples and comparing the sample of interest to the baseline model) and iterate to inspect the samples in a sequence order using a moving window for selecting the baseline samples for each sample of interest. By using the reference model created based on neighboring samples as the baseline and assuming the baseline samples and the sample of interest having the same noise signature, the automated high-speed X-ray inspection system may effectively eliminate or reduce the influence from the systematically varying noise or interfering patterns.

[High Dynamic Range X-Ray Detector]

In particular embodiments, the automated high-speed X-ray inspection system may determine whether there are defects in the inspected sample based on a single X-ray image generated at a substantially orthogonal direction to a plane of the inspected sample. In particular embodiments, the automated high-speed X-ray inspection system may include an X-ray detector with a high dynamic range (e.g., greater than or equal to 10 K). In other words, the X-ray detector may generate X-ray images having greater than 10 K grayscale levels. In particular embodiments, the X-ray detector may generate X-ray images having greater than 65 K grayscale levels. The high dynamic range may allow the X-ray images to provide more detailed information (e.g., a higher grayscale resolution) for the inspected samples. In particular embodiments, the automated high-speed X-ray inspection system may use one or more computer algorithms (e.g., artificial intelligence algorithms, machine-learning models, computer vision algorithms) to determine whether or not there are some defective elements in the inspected sample taking advantage of the high dynamic range of the X-ray images. By using the computer algorithms, the automated high-speed X-ray inspection system may effectively identify the features or/and attributes that may not be discernable to human eyes and detect the defective elements based on such features or/and attributes. The automated high-speed X-ray inspection system may use the grayscale values and grayscale variation to identify the features or/and attributes while the human inspector may rely on edge or shape information. As a result, the automated high-speed X-ray inspection system may have a faster inspection speed and a higher detection accuracy than the traditional CT technologies which generate and process the X-ray images to be inspected by human eyes.

[High Dynamic Range X-Ray Image Multiple Images with Different Exposure Levels]

In particular embodiments, the automated high-speed X-ray inspection system may include multiple X-ray sensors or detectors each having a relative smaller dynamical range (e.g., less than 10 K). The automated high-speed X-ray inspection system may generate X-ray images with a high dynamic range (e.g., more than 10 K grayscale levels) by combining multiple X-ray images generated under different X-ray exposure levels. As an example and not by way of limitation, the automated high-speed X-ray inspection system may generate a number of X-ray images using the multiple low dynamic range X-ray detectors under different X-ray exposure levels and adding the low dynamic X-ray images (e.g., less than 10 K) together to create an X-ray image having a higher dynamic range (e.g., greater than or equal to 10 K). The resulting high dynamic rage X-ray image may include a superposition of the multiple low dynamic range X-ray images.

[Second X-Ray Image Confirms or Invalidates a False Positive]

In particular embodiments, the automated high-speed X-ray inspection system may determine whether or not one or more defects are associated with one or more elements of interest based on a single X-ray image of the inspected sample generated at a first direction (e.g., a top-down direction, a substantially orthogonal direction to a plane of the inspected sample). As an example and not by way of limitation, the automated high-speed X-ray inspection system may extract one or more first features from a top-down X-ray image and determine that there are the one or more defects associated with the element of interest of the inspected sample based on the one or more first features extracted from the signal top-down X-ray image. In particular embodiments, the one or more first features may include, for example, but are not limited to, a material thickness value, a material thickness variation, a material thickness profile, an element shape, an element size, a distance between the element of interest to another element, a position of the element of interest in the first X-ray image, a relative position of the element of interest to another element, a geometric signature associated with the element of interest, etc.

However, in some situations, the detection results of the defective elements may be false positive results due to noise or interfering patterns in the X-ray image. In particular embodiments, the automated high-speed X-ray inspection system may generate a second X-ray image of the inspected sample at a second direction (e.g., an oblique direction) different from the first direction and use the second X-ray image to confirm or invalidate the detected defective elements of the inspected sample. As an example and not by way limitation, particular embodiments of the automated high-speed X-ray inspection system may generate a second X-ray image of the inspected sample at an oblique direction and extract one or more second features from the second X-ray image or a combination of the first X-ray image and the second X-ray image. For example, the automated high-speed X-ray inspection system may determine the one or more second features by comparing the first X-ray image and the second X-ray image. In particular embodiments, the one or more second features may include, for example, but are not limited to, a stacking order of two or more layers, a position change of the element of interest, a shape change of the element of interest, a position change of an interfering element, a shape change of an interfering element, one or more grayscale value changes associated with the element of interest, one or more grayscale value changes associated with an interfering element, any difference between the first X-ray image and the second X-ray image, etc.

In particular embodiments, the automated high-speed X-ray inspection system may confirm that the one or more defects are associated with the element of interest based on one or more second features confirming the one or more first features. As an example and not by way of limitation, the automated high-speed X-ray inspection system may detect a bridging defect between two solder joints based on the top-down X-ray image. The automated high-speed X-ray inspection system may generate a second X-ray image of the inspected sample at a different direction and may confirm that the bridging defect between the two solder joint is an actual a bridging defect. The automated high-speed X-ray inspection system may confirm the detected defects and determine that these defection results are not false positive results. In particular embodiments, the automated high-speed X-ray inspection system may report or flag the detected defective elements only if that defective element is confirmed by at least two X-ray images of the inspected sample generated at different directions.

In particular embodiments, the automated high-speed X-ray inspection system may invalidate the determination that the one or more defects are associated with the element of interest based one or more second features invalidating the determination based on the one or more first features. As an example and not by way limitation, the automated high-speed X-ray inspection system may detect a bridging defect between two solder joints based on the top-down X-ray image. The automated high-speed X-ray inspection system may generate a second X-ray image of the inspected sample at a different direction and may identify that the "bridging defect" between the two solder joint is actually a back-drilled via which is vertically located in other layers different from the solder joints and is spatially located between the two solder joints (making them appear to be bridged from the top-down X-ray image) in the plane orthogonal to the top-down direction. The automated high-speed X-ray inspection system may invalidate the detected bridging defects and determine that these defection results are false positive results. In particular embodiments, the automated high-speed X-ray inspection system may report or flag the detected defective elements only if that defective element is confirmed by at least two X-ray images of the inspected sample generated at different directions.

[False Negative Caused by Difference in Element Sizes]

In particular embodiments, in some situations, the automated high-speed X-ray inspection system may have false negative results (e.g., not identifying defects when there are one or more defects) due to a number of factors (e.g., noise, interfering patterns, element size variations, element location variations, etc.). In particular embodiments, when the automated high-speed X-ray inspection system determines that there is no defects in the inspected element based on a first X-ray image (e.g., a top-down X-ray image, a bottom-up X-ray image, or an X-ray image captured from any suitable angle), the automated high-speed X-ray inspection system may perform another inspection by generating and analyzing a second X-ray image of the inspected sample from a different direction. In particular embodiments, the automated high-speed X-ray inspection system may determine that there is no defects in the inspected sample only after being confirmed by at least two X-ray images of the inspected sample generated at different directions.

In particular embodiments, in some situations, the automated high-speed X-ray inspection system may have false negative results from the inspection based on a single X-ray image (e.g., a top-down X-ray image, a bottom-up X-ray image, or an X-ray image captured at any suitable angle) and may perform one or more further inspections by adjusting one or more parameters used by the computer algorithms or inspection models. As an example and not by way of limitation, the automated high-speed X-ray inspection system may fail to detect one or more defective elements because these elements fall beyond the parameter ranges used by the computer algorithms. For example, the automated high-speed X-ray inspection system may fail to detect one or more defective solder joints because these solder joints have usual large size variation of 70±60 μm which is beyond the parameters range of 70±5 μm used by the computer algorithms. The automated high-speed X-ray inspection system may adjust the parameter ranges from 70±5 μm to the 70±60 μm and re-inspect the inspected sample using the adjusted parameters. The automated high-speed X-ray inspection system may effectively detect the defective elements that are missed during the initial inspection by using the adjusted parameters.

Example Method

FIG. 4 illustrates an example method 5800 for identifying defective solder connections based on a single X-ray image. The method may begin at step 5802, where a computing system associated with an automated high-speed X-ray inspection system may generate a first X-ray image of a device from a first direction (e.g., top-down image from the orthogonal direction of the device under test). At step 5804, the computing system may use a machine-learning model to identify an element of interest of the device from the first X-ray image which may include a number of interfering elements (e.g., conductive strips, wires, solder pads, solder balls of the same or different layers) which overlap or intersect with the element of interest in the first X-ray image (and therefore may interfere the measurement of the element of interest). At step 5806, the computing system may use the machine-learning model to determine one or more features associated with the element of interest along an orthogonal direction of the device. The one or more features may be determined based on variations of corresponding grayscale values of the first X-ray images. At step 5808, the computing system may determine one or more quality metrics associated with the element of interest based on the one or more features associated with the element of interest.

In particular embodiments, the automated high-speed X-ray inspection system may generate a second X-ray image of the device from a second direction different from the first direction. The system may use the machine-learning model to identify the element of interest of the device in the second X-ray image which may include a number of interfering elements. The system may determine the one or more features associated with the element of interest based on variations of corresponding grayscale values in the first X-ray image and the second X-ray image, the first direction associated with the first X-ray image, and the second direction associated with the second X-ray image. In particular embodiments, the first direction associated with first X-ray image may be the orthogonal direction of the device and the second direction associated with the second X-ray image may be an oblique direction of the device. In particular embodiments, the machine-learning model may be trained by historical data to isolate the element of interest from the plurality of interfering elements and identify one or more defects associated with the element of interest.

In particular embodiments, the element of interest may be or may include a solder connection. The computing system may identify the solder connection as a qualified solder connection when the one or more quality metrics of the solder connection meet one or more quality criteria. When the one or more quality metrics of a solder connection fail to meet one or more quality criteria, the system may use the machine-learning model to identify one or more defects associated with the solder connection. In particular embodiments, the defects may include, for example, but are not limited to, a void defect, a head-in-pillow defect, a non-wet defect, a non-contact open defect, a bridging/short defect, etc. In particular embodiments, the one or more features associated with the element of interest may include, for example, but are not limited to, a material thickness, a shape, a size, a distance to other elements, a position, a relative placement to other elements, a stacking order, a profile variation, a gradient, etc. It is notable that the processes and methods as described herein may include generating any suitable number of X-ray images and identifying defective components based on the generated X-ray images. In particular embodiments, the system may identify the defective solder connections based on a single X-ray image generated from a top-down or any oblique direction, two X-ray images generated from two different directions, or N number of X-ray images generated from any suitable directions, where N could be any suitable integer.

In particular embodiments, an automated high-speed X-ray inspection system may generate a first X-ray image of an inspected sample at a first direction. The first X-ray image may be a high-resolution grayscale image. In particular embodiments, the high-resolution grayscale image may refer to an image having a number of pixels greater than or equal to 12 megapixels. In particular embodiments, the high-resolution grayscale image may refer to an image having a number of pixels greater than or equal to 29 megapixels. In particular embodiments, the high-resolution grayscale image may refer to an image providing an optical spatial resolution less than or equal to 10 microns for the X-ray image-based measurement. In particular embodiments, the high-resolution grayscale image may refer to an image providing an optical spatial resolution less than or equal to 5 microns for the X-ray image-based measurement. The first direction may be substantially orthogonal to a plane of the inspected sample. The automated high-speed X-ray inspection system may identify, from a number of elements of the inspected sample, one or more elements of interest of the inspected sample based on the first X-ray image. The first X-ray image may include a number of interfering elements that interfere with the one or more elements of interest in the first X-ray image. The automated high-speed X-ray inspection system may determine, for each of the one or more elements of interest, one or more first features associated with the respective element of interest. The one or more first features may be determined based on variations of grayscale values in the first X-ray images. The automated high-speed X-ray inspection system may determine, for each of the one or more elements of interest, whether one or more defects are associated with the respective element of interest based on the one or more first features associated with the element of interest.

In particular embodiments, the first X-ray image may be generated by an X-ray detector having a high dynamic range (e.g., greater than 10 K) and the first X-ray image may have greater than 10 K grayscale levels. In particular embodiments, the first X-ray image having a high dynamic range (e.g., having greater than 10 K grayscale levels) may be a superposition of multiple low dynamic range X-ray images generated with different X-ray exposure settings using one or more low dynamic range X-ray detectors (e.g., having a dynamic range lower than 10 K). In particular embodiments, the one or more first features may be determined based on a material thickness along the first direction using a machine-learning model. In particular embodiments, the one or more first features may include, for example, but are not limited to, a material thickness value, a material thickness variation, a material thickness profile, an element shape, an element size, a distance between the element of interest to another element, a position of the element of interest in the first X-ray image, a relative position of the element of interest to another element, a geometric signature associated with the element of interest, etc.

In particular embodiments, the automated high-speed X-ray inspection system may generate a second X-ray image of the inspected sample from a second direction different from the first direction. The automated high-speed X-ray inspection system may determine one or more second features associated with the element of interest by comparing the first X-ray image and the second X-ray image. In particular embodiments, the one or more second features may include, for example, but are not limited to, a stacking order of two or more layers, a position change of the element of interest, a shape change of the element of interest, a position change of an interfering element, a shape change of an interfering element, one or more grayscale value changes associated with the element of interest, one or more grayscale value changes associated with an interfering element, etc.

In particular embodiments, the automated high-speed X-ray inspection system may determine that the one or more defects associated with the element of interest are false positive results based on a determination that the one or more second features of the element of interest invalidate the determination that the one or more defects are associated with the element of interest based on the one or more first features. In particular embodiments, the automated high-speed X-ray inspection system may confirm the one or more defects being associated with the element of interest based on a determination that the one or more second features confirm that the one or more defects are associated with the element of interest based on the one or more first features.

In particular embodiments, the one or more defects associated with the element of interest may be identified by a machine-learning model. The machine-learning model may be trained by a large sample population (e.g., greater than 10 K samples). The machine-learning model, after being trained, may identify and isolate the element of interest from a number of interfering elements. In particular embodiments, the automated high-speed X-ray inspection system may generate two or more reference X-ray images for respective adjacent inspected samples of the inspected sample. The automated high-speed X-ray inspection system may generate a reference model for the inspected sample based on the two or more reference X-ray images. The automated high-speed X-ray inspection system may compare, using a computer vision algorithm, the first X-ray image of the inspected sample to the reference model and identify the one or more defects associated with the element of interest based on the comparison between the first X-ray image and the reference model. In particular embodiments, the element of interest may be a solder connection and the one or more defects associated with the solder connection may include, for example, but are not limited to, a void defect, a head-in-pillow defect, a non-wet defect, a non-contact open defect, a misalignment, a bridging/short defect, etc.

In particular embodiments, the automated high-speed X-ray inspection system may include an X-ray source emitting an X-ray beam with a white spectrum and one or more X-ray filters filtering out respective spectrum ranges of the X-ray beam. In particular embodiments, the one or more X-ray filters may a first X-ray filter corresponding to a first spectrum range being absorbable by a first material and a second X-ray filter corresponding to a second spectrum range being absorbable by a second material. The automated high-speed X-ray inspection system may generate a first material selective X-ray image with the first X-ray filter being applied to the X-ray source. The first material selective X-ray image may exclude the elements made of the first material. The automated high-speed X-ray inspection system may generate a second material selective X-ray image with the second X-ray filter being applied to the X-ray source. The second material selective X-ray image may exclude elements made of the second material. The automated high-speed X-ray inspection system may generate an enhanced X-ray image by combining the first material selective X-ray image and the second material selective image. The enhanced X-ray image may have a higher signal-to-noise ratio than the first X-ray image. In particular embodiments, the one or more defects associated with the element of interest may be identified based on the first material selective X-ray image, the second material selective X-ray image, or the enhanced X-ray image. In particular embodiments, the automated high-speed X-ray inspection system may include a low energy X-ray filter filtering out low energy X-ray components from the X-ray beam to prevent potential damages to the inspected samples.

Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for identifying defective solder connections based on a single X-ray image including the particular steps of the method of FIG. 4, this disclosure contemplates any suitable method for identifying defective solder connections based on a single X-ray image including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Advantages: Inspection Speed.

A significant advantage of this invention is that an extended source of X-rays can be used, increasing the available flux of X-rays used for imaging. This in turn increases the throughput possible for the system. Put another way, in the time to acquire a single inspection image with a PPM system, the proposed invention can acquire over 300,000 images with the same resolution.

Consider the following comparison with the PPM X-ray system. The time to acquire an image depends on the flux $\Phi$ of X-rays:

$$T_{acquire} = (P_\# \times X_P)/\Phi$$

where $P_\#$ is the number of pixels, $X_P$ is the number of X-rays per pixel, and $\Phi$ is the X-ray flux. The X-ray flux from a point source is:

$$Flux = \Phi = \beta \times \Omega \times S_A$$

where $\beta$ is the point source brightness, $\Omega$ is the angular distribution in mrad² and $S_A$ is the point source area $S_A = \pi r^2$. The source spot size for X-ray systems is typically defined using the ASTM standard SE-1165 ["Standard Test Method for Measurement of Focal Spots of Industrial X-ray Tubes by Pinhole Imaging," ASTM Committee E-7 on Nondestructive Testing, May 15, 1992].

A typical X-ray source brightness $\beta$ is $$\beta = 10^8 \text{ X-rays/sec/mm}^2/\text{mrad}^2.$$

To avoid parallax errors in automated inspection, the PPM X-ray beam should be well collimated; a divergence of 20 mrad is typical. For a point source with $$\Omega = (20 \text{ mrad})^2 = 400 \text{ mrad}^2$$

and a source spot diameter $d = 2r = 1$ µm $= 10^{-3}$ mm, the flux is given by:

$$\text{Flux} = \Phi = \beta \times \Omega \times S_A =$$
$$10^8 \times \pi \times [0.5 \times 10^{-3}]^2 \text{ X-rays/sec} = 400 \times \pi \times 10^8 \times [10^{-3}]^2 \text{ X-rays/sec} =$$
$$400 \times \pi \times 25 \text{ X-rays/sec} = 31,416 = 3.14 \times 10^4 \text{ X-rays/sec}.$$

A typical X-ray image sensor may have 512×512 pixels that need 1,000 X-rays/pixel for image formation. An image for a PPM system will therefore be collected in approximately 8,350 seconds, or 2.3 hours.

On the other hand, keeping the same source brightness, but illuminating with a larger source spot size according to the invention dramatically increases the X-ray flux illuminating the object. As an example, assume a source with a 1 mm diameter (r=0.5 mm) separated by 100 mm from the object and, furthermore, assume that the distance from the object to scintillator is 100 microns. The angular divergence of the X-ray beam is given by:

$$\alpha = 1 \text{ mm}/100 \text{ mm} = 10 \text{ mrad},$$

making $$\Omega = 100 \text{ mrad}^2.$$

The spot area is $=\pi \times [0.5]^2 = 0.785$ mm², so the flux becomes:

$$\text{Flux} = \Phi = 10^8 \times 100 \times 0.785 \text{ photons/sec} = 7.85 \times 10^9 \text{ photons/sec}$$

which is higher than the PPM configuration by a factor of 250,000 times. Therefore, the same 512×512 image (with 1,000 X-rays per pixel) can now be produced at high speed and, for example, may now have a proportionally faster image collection time of approximately 33 msec.

As a practical matter, the throughput enhancement may be further reduced by a factor of between 2 and 10 from this number. A PPM imaging system can detect X-rays in the enlarged shadow image directly with a CCD X-ray detector, which can have a quantum efficiency between 50% to 100%. The typical X-ray CCD array comprises an array of pixels, with a pixel size of approximately 100 µm×100 µm.

In comparison, the high-resolution direct-shadow images for the system of the disclosed invention come from an extended X-ray source, and are not magnified. The pixels of contemporary X-ray imaging detectors are far too large to resolve the proximity images. Instead, the invention disclosed here comprises a scintillator to convert the X-rays to optical photons, and then magnifies this optical image.

In order to achieve a particular resolution, there may be thickness specifications for the scintillator. For a resolution of 1 micron, for example, the scintillator may have a specified thickness between 1 and 10 microns. For thin scintillators, some of the incident X-rays will pass through the scintillator without being absorbed. Therefore, the quantum efficiency of this conversion process may worse than the PPM system, emitting visible photons for approximately 20% of the X-rays passing through the scintillator. Beyond this, the microscope may lose additional photons, depending on the optical system NA and the quantum efficiency of the visible CCD detector. However, even with these losses, the benefit provided by the higher flux of the extended source still provides a significant advantage.

Advantages: Imaging Resolution.

The resolution of the prior art PPM system is determined by the spot size of the X-ray source. For example, a source with a 1 micron spot size will produce images with 1 micron resolution, assuming the system is operating at optimal resolution. Practically speaking, it is difficult to achieve resolution much below 1 micron with a PPM system, due to rapidly decreasing efficiency of the X-ray source for small spot sizes. As the spot size of the X-ray source decreases, the X-ray power must be reduced to avoid melting the X-ray target. Furthermore, the X-ray target must be made thinner, to reduce scattering in the target. As a result, for each 2× decrease in spot size, the flux from the source decreases a factor of about 2× to 4×. Overall the throughput will decrease at least 8× for a 2× improvement in resolution.

For the imaging system according to the invention, the scintillator is in close proximity to the object being examined, and photons emitted are in proportion to the X-rays. For the optical system that relays the photons emitted by the scintillator to the detector, assuming a scintillator emission wavelength of λ=535 nm and a solid immersion optical system with NA≈1.75 comprising LuAG optical elements with refractive index n=1.84, the definition for the diffraction-limited resolution R of the optical system relaying scintillator photons to the detector is:

$$R = \frac{\lambda}{2*NA} * = \frac{535 \text{ nm}}{2*1.75} = 153 \text{ nm}$$

which is 6.5 times smaller than the 1 micron resolution of the PPM system.

Advantages: Time to Market.

The high speed at which non-destructive images at resolutions smaller than 50 microns can be gathered can improve the time to market for the development of manufacturing processes such as the flip chip interconnect (FCI) process described earlier. The destructive processes for failure analysis, also described earlier, can take weeks to collect a single image, and months to acquire statistical data on parts. Because of the rapid time in which images can be collected and analyzed using the system of the present invention, process development time for such products can be counted in days, and is typically a fraction of the total time required to design and bring to market a new product.

Furthermore, because of the enhanced resolution, the present invention can be used for the new FCI processes with pitches smaller than 50 microns. The present invention can be used for significantly smaller pitches, and still maintain the desired image resolution and speed. In terms of the product development cycle, an increase in time for feedback of one to several weeks has a distinct and significant impact on the time required to develop a new product. In a simple case, perhaps three to five cycles of setup and data collection may be sufficient to establish a process for a new device. In a more complex case, such as a high-density interposer or a 3D IC, tens or hundreds of iterations may be required. Without the present invention, each of these cycles may take several weeks, and the total time to market of the product may come to be dominated by these cycles. Clearly a method of determining the quality of fine pitch (50 microns and smaller) bonds at the time of processing offers a significant advantage.

The images and calculations produced by the system and methods disclosed herewith allow the quality of bonds to be examined immediately after bonding in a matter of seconds or minutes. In order to develop and qualify a new semiconductor product for mass production, many individual processes and the integration of these processes must be established, tuned, and tested. In the case of forming a through-silicon via (TSV) in a semiconductor wafer, the process flow typically requires that the vias be formed first and the capture pads be subsequently formed on the wafer surface over the vias. Since the capture pads obscure optical inspection of the vias themselves, in the absence of the present invention, the alignment between the vias and the capture pads may not be accurately determined at the time of manufacturing without cutting the silicon wafer and inspecting this feature in cross-section. Since this procedure is time consuming and also destroys the silicon wafer and any economic value contained within it, it is therefore undesirable.

In the case of bonding two or more chips or substrates or even complete wafers together using FCI, the alignment, bonding force, bonding temperature, rate of heating, and rate of cooling among other factors must be tightly controlled. While control of manufacturing equipment and processes can enable some of the necessary control, inspection and measurement of features within the product that are not optically visible may also be required. Without the use of the apparatus disclosed in this invention, assembled parts must be cross-sectioned in order to be inspected. Given the fine pitch of the interconnect bonds and the very large quantity of connections, this procedure can take several weeks. Even so, typically only a very small subset of the total interconnect bonds may actually be inspected.

The inability to inspect bonds quickly can add significantly to the length of time required to fine tune both individual process steps as well as the integration of multiple process steps to create a finished product. For example, consider a case where 25 iterations of the bonding process are required to develop and qualify a product. In the case without the apparatus disclosed in this invention, each iteration may require 1 week to build each group of samples under various process and tooling configurations. After manufacturing a group of samples, an additional 2 weeks may be required to cross-section individual units and inspect the quality and attributes of the bonds that have been created. The total time is therefore: 25 cycles×(1 week making+2 weeks inspection)=75.0 weeks.

With the use of the apparatus disclosed in this invention, the 2 weeks of inspection can be reduced to a few minutes by eliminating the need for time consuming cross-sectioning. The total time for the sequential cycles may now be calculated as: 25 cycles×(1 week making+1 hour inspection)=25.15 weeks, a reduction by 49.85 weeks (or 66% of the initial time to market). With high-volume consumer electronic devices such as mobile phones selling in volumes of more than 100 million units a year, it can be easily seen that a decrease in time to market by 50 weeks (almost one year) can have significant impact on the market. The apparatus may further be integrated into the bonding tool or via filling tool, for example the electrochemical deposition tool, to provide feedback to the bonding process in real time. The use of the apparatus in this way reduces time to market by many weeks and may in fact enable a product to enter the market that otherwise would be too costly or too late to market to have economic value.

Advantages: Product Yield and Cost.

It has been reported that commercial production began on these devices with overall yields related to package assembly and interconnect in the range of 80%. This yield is far lower than typically accepted in the semiconductor field, and there is considerable additional cost associated with the scrap material. However, this particular part was determined to have such high commercial value that, even considering the cost associated with low yield, it was commercially feasible to produce with only 80% package assembly yield. In other lower-cost, more consumer-oriented segments of the market, pressure on pricing is much more intense, and it is unlikely that a product with package assembly yields at this level could be commercially viable. For this reason, it is necessary for the manufacturing process to be highly capable and tightly controlled, such that the amount of scrap product or yield loss resulting from the bonding process is reduced. Traditionally, package assembly yields are in the 98 to 99% range. Those skilled in the art will quickly realize that scrapping good chips by using poorly yielding bonding techniques, and packaging yields of 80% for lower value chips, are simply not acceptable.

It should be noted that, in the case of multiple dice mounted together either as a 3D IC or onto a high-density interposer, the failure of one connection on any chip will result in the scrapping of the entire MCP or package assembly. There may be thousands or tens of thousands of connections that must all function as designed. It is rare that any kind of rework or recovery of materials can be accomplished if any of the bonds are not produced correctly. For example, take the case when a processor chip with a cost of $10 is mounted together with four memory chips costing $5 each, or $20. The total cost of the chips is therefore $30. Chip assembly and packaging may add another $5 of cost for a total assembly cost of $35.

By using the images and measurements produced by the apparatus in this disclosure, the processes of aligning, inspection bonding can be controlled and monitored such that the yield can be rapidly increased. For MCP packages, in the example above, detecting a flaw between the first two dice will allow the packaging assembler to scrap the first two die only, and not require the loss of all five dice, therefore saving scrap costs and improving yield. It is common for well-controlled and monitored assembly processes to have yields of over 99.9%. The present invention allows a packaging assembler to achieve a yield of greater than or equal to 90% in MCP structures having more than 4 dice and having more than 100 TSVs per interposer or die layer at pitches where the smallest pitch is less than 100 microns. The same yield advantage may be achieved in the flip chip configuration having more than 400 microbumps at a pitch where the smallest pitch is less than 100 microns.

This same advantage in cost and yield can be seen at other steps in the manufacturing process for fine-pitch interposers and 3D die stacking, such as via fill monitor for voids, via capture pad alignment to via, alignment of chip-bump to chip or interposer pad, and quality of completed joint after bonding. It may also be used to measure bondline in the assembly of multiple slices of silicon devices or fine pitch interposers or between silicon devices and other materials of interest where this bondline thickness is critical to device performance.

Miscellaneous.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an automated high-speed X-ray inspection system:
   generating a first X-ray image of an inspected sample at a first direction, wherein the first X-ray image is a high-resolution grayscale image, wherein the first direction is substantially orthogonal to a plane of the inspected sample;
   identifying, from a plurality of elements of the inspected sample, one or more elements of interest of the inspected sample based on the first X-ray image, wherein the first X-ray image comprises a plurality of interfering elements from the plurality of elements that interfere with the one or more elements of interest in the first X-ray image;
   determining, for each of the one or more elements of interest, one or more first features associated with the respective element of interest, wherein the one or more first features are determined based on variations of grayscale values in the first X-ray images;
   determining, for each of the one or more elements of interest, whether one or more defects are associated with the respective element of interest based on the one or more first features associated with the element of interest;
   wherein the automated high-speed X-ray inspection system comprises an X-ray source emitting an X-ray beam with a white spectrum and one or more X-ray filters filtering out respective spectrum ranges of the X-ray beam, and wherein the one or more X-ray filters comprise a first X-ray filter corresponding to a first spectrum range being responsive to a first material and a second X-ray filter corresponding to a second spectrum range being responsive to a second material, and generating a first material selective X-ray image with the first X-ray filter being applied to the X-ray source, wherein the first material selective X-ray image excludes elements made of the first material, and generating a second material selective X-ray image with the second X-ray filter being applied to the X-ray source, wherein the second material selective X-ray image excludes elements made of the second material; and generating an enhanced X-ray image by combining the first material selective X-ray image and the second material selective image, wherein the enhanced X-ray image have a higher signal-to-noise ratio than the first X-ray image.

2. The method of claim 1, wherein the high-resolution grayscale image has a number of pixels greater than or equal to 12 megapixels.

3. The method of claim 2, wherein the high-resolution grayscale image has a number of pixels greater than or equal to 29 megapixels.

4. The method of claim 1, wherein the first X-ray image is generated by an X-ray detector having a dynamic range greater than 10 K, and wherein the first X-ray image has greater than 10 K grayscale levels.

5. The method of claim 1, wherein the first X-ray image is a superposition of multiple low dynamic range X-ray images taken with different X-ray exposure settings using an X-ray detector having a dynamic range lower than 10 K.

6. The method of claim 1, wherein the one or more first features are determined based on a material thickness along the first direction using a machine-learning model.

7. The method of claim 6, wherein the one or more first features comprise one or more of:
a material thickness value;
a material thickness variation;
a material thickness profile;
an element shape;
an element size;
a distance between the element of interest to another element;
a position of the element of interest in the first X-ray image;
a relative position of the element of interest to another element; or
a geometric signature associated with the element of interest.

8. The method of claim 1, further comprising:
generating a second X-ray image of the inspected sample from a second direction different from the first direction; and
determining one or more second features associated with the element of interest by comparing the first X-ray image and the second X-ray image.

9. The method of claim 8, wherein the one or more second features comprise one or more of:
a stacking order of two or more layers;
a position change of the element of interest;
a shape change of the element of interest;
a position change of an interfering element;
a shape change of an interfering element;
one or more grayscale value changes associated with the element of interest; or
one or more grayscale value changes associated with an interfering element.

10. The method of claim 8, further comprising:
determining that the one or more defects associated with the element of interest are false positive results based on a determination that the one or more second features of the element of interest invalidate that the one or more defects are associated with the element of interest based on the one or more first features.

11. The method of claim 8, further comprising:
confirming the one or more defects being associated with the element of interest based on a determination that the one or more second features confirm that the one or more defects are associated with the element of interest based on the one or more first features.

12. The method of claim 1, wherein the one or more defects are identified by a machine-learning model, wherein the machine-learning model is trained by a sample population comprising at least 10 K samples, and wherein the machine-learning model, after being trained, isolates the element of interest from the plurality of interfering elements.

13. The method of claim 1, further comprising:
generating two or more reference X-ray images for respective adjacent inspected samples of the inspected sample; and
generating a reference model for the inspected sample based on the two or more reference X-ray images.

14. The method of claim 13, further comprising:
comparing, by a computer vision algorithm, the first X-ray image of the inspected sample to the reference model, wherein the one or more defects associated with the element of interest are identified based on the comparison between the first X-ray image and the reference model.

15. The method of claim 1, wherein the element of interest comprises a solder connection, and wherein the one or more defects comprise one or more of:
a void defect;
a head-in-pillow defect;
a non-wet defect;
a non-contact open defect;
a misalignment; or
a bridging/short defect.

16. The method of claim 1, wherein the one or more defects associated with the element of interest are identified based on the first material selective X-ray image, the second material selective X-ray image, or the enhanced X-ray image.

17. The method of claim 1, wherein the one or more X-ray filters comprise a low energy X-ray filter filtering out low energy X-ray components from the X-ray beam.

* * * * *